(12) United States Patent
Short et al.

(10) Patent No.: US 7,689,716 B2
(45) Date of Patent: Mar. 30, 2010

(54) SYSTEMS AND METHODS FOR PROVIDING DYNAMIC NETWORK AUTHORIZATION, AUTHENTICATION AND ACCOUNTING

(75) Inventors: Joel E. Short, Los Angeles, CA (US); Florence C. I. Pagan, Los Angeles, CA (US); Josh J. Goldstein, Agoura Hills, CA (US)

(73) Assignee: Nomadix, Inc., Agoura Hills, CA (US)

( * ) Notice: Subject to any disclaimer, the term of this patent is extended or adjusted under 35 U.S.C. 154(b) by 807 days.

(21) Appl. No.: 11/427,143

(22) Filed: Jun. 28, 2006

(65) Prior Publication Data

US 2006/0239254 A1 Oct. 26, 2006

Related U.S. Application Data

(63) Continuation of application No. 09/693,060, filed on Oct. 20, 2000, now Pat. No. 7,194,554, which is a continuation-in-part of application No. 09/485,569, filed on Dec. 8, 1999, now Pat. No. 6,636,894.

(60) Provisional application No. 60/111,497, filed on Dec. 8, 1998, provisional application No. 60/161,182, filed on Oct. 22, 1999, provisional application No. 60/160,890, filed on Oct. 22, 1999, provisional application No. 60/161,139, filed on Oct. 22, 1999, provisional application No. 60/161,189, filed on Oct. 22, 1999, provisional application No. 60/160,973, filed on Oct. 22, 1999, provisional application No. 60/161,181, filed on Oct. 22, 1999, provisional application No. 60/161,093, filed on Oct. 22, 1999.

(51) Int. Cl.
*G06F 15/16* (2006.01)

(52) U.S. Cl. .................. 709/246; 709/217; 709/220; 709/227; 709/230

(58) Field of Classification Search ................. 709/225, 709/227, 230, 217, 220
See application file for complete search history.

(56) References Cited

U.S. PATENT DOCUMENTS 4,026,642 A 5/1977 Tanaka et al.

(Continued)

FOREIGN PATENT DOCUMENTS

CA 2 330 857 11/1999

(Continued)

OTHER PUBLICATIONS

Complaint, Demand for Jury Trial; *IPE Networks, Inc.* vs. *Nomadix, Inc.*; Case No. 04 CV 1485 DMS (POR); 45 pages; Filed Jul. 23, 2004; United States District Court, Southern District of California.

(Continued)

*Primary Examiner*—Michael Won
(74) *Attorney, Agent, or Firm*—Knobbe, Martens, Olson & Bear, LLP

(57) ABSTRACT

Systems and methods for selectably controlling and customizing source access to a network, where the source is associated with a source computer, and wherein the source computer has transparent access to the network via a gateway device and no configuration software need be installed on the source computer to access the network. A user may be prevented access from a particular destination or site based upon the user's authorization while being permitted to access to other sites that the method and system deems accessible. The method and system can identify a source without that source's knowledge, and can access customizable access rights corresponding to that source in a source profile database. The source profile database can be a remote authentication dial-in user service (RADIUS) or a lightweight directory access protocol (LDAP) database. The method and system use source profiles within the source profile database to dynamically authorize source access to networks and destinations via networks.

114 Claims, 14 Drawing Sheets

U.S. PATENT DOCUMENTS

| | | |
|---|---|---|
| 4,233,661 A | 11/1980 | Bolton et al. |
| 4,509,277 A | 4/1985 | Bolton |
| 4,649,533 A | 3/1987 | Chorley et al. |
| 4,654,793 A | 3/1987 | Elrod |
| 4,691,346 A | 9/1987 | Vanacore |
| 4,757,267 A | 7/1988 | Riskin |
| 4,806,743 A | 2/1989 | Thenery |
| 4,816,654 A | 3/1989 | Anderl et al. |
| 5,019,697 A | 5/1991 | Postman |
| 5,030,807 A | 7/1991 | Landt et al. |
| 5,113,499 A | 5/1992 | Ankney et al. |
| 5,148,389 A | 9/1992 | Hughes |
| 5,149,945 A | 9/1992 | Johnson et al. |
| 5,159,592 A | 10/1992 | Perkins |
| 5,221,838 A | 6/1993 | Gutman et al. |
| 5,226,120 A | 7/1993 | Brown et al. |
| 5,235,595 A | 8/1993 | O'Dowd |
| 5,243,652 A | 9/1993 | Teare et al. |
| 5,251,207 A | 10/1993 | Abensour et al. |
| 5,253,161 A | 10/1993 | Nemirovsky et al. |
| 5,280,581 A | 1/1994 | Bathrick et al. |
| 5,287,269 A | 2/1994 | Dorrough et al. |
| 5,287,461 A | 2/1994 | Moore |
| 5,289,371 A | 2/1994 | Abel et al. |
| 5,289,536 A | 2/1994 | Hokari |
| 5,309,437 A | 5/1994 | Perlman et al. |
| 5,319,648 A | 6/1994 | Bux et al. |
| 5,321,395 A | 6/1994 | Van Santbrink |
| 5,325,362 A | 6/1994 | Aziz |
| 5,334,821 A | 8/1994 | Campo et al. |
| 5,335,268 A | 8/1994 | Kelly, Jr. et al. |
| 5,337,352 A | 8/1994 | Kobayashi et al. |
| 5,351,186 A | 9/1994 | Bullock et al. |
| 5,371,852 A | 12/1994 | Attanasio et al. |
| 5,377,060 A | 12/1994 | Nigam |
| 5,410,543 A | 4/1995 | Seitz et al. |
| 5,412,654 A | 5/1995 | Perkins |
| 5,425,029 A | 6/1995 | Hluchyj et al. |
| 5,425,085 A | 6/1995 | Weinberger et al. |
| 5,426,427 A | 6/1995 | Chinnock et al. |
| 5,430,782 A | 7/1995 | Brady et al. |
| 5,432,789 A | 7/1995 | Armstrong et al. |
| 5,442,633 A | 8/1995 | Perkins et al. |
| 5,446,735 A | 8/1995 | Tobagi et al. |
| 5,490,139 A | 2/1996 | Baker et al. |
| 5,517,618 A | 5/1996 | Wada et al. |
| 5,517,622 A | 5/1996 | Ivanoff et al. |
| 5,519,769 A | 5/1996 | Weinberger et al. |
| 5,538,007 A | 7/1996 | Gorman |
| 5,539,736 A | 7/1996 | Johnson et al. |
| 5,557,677 A | 9/1996 | Prytz |
| 5,557,748 A | 9/1996 | Norris |
| 5,572,528 A | 11/1996 | Shuen |
| 5,586,121 A | 12/1996 | Moura et al. |
| 5,586,269 A | 12/1996 | Kubo |
| 5,596,722 A | 1/1997 | Rahnema |
| 5,602,991 A | 2/1997 | Berteau |
| 5,608,786 A | 3/1997 | Gordon |
| 5,612,730 A | 3/1997 | Lewis |
| 5,617,565 A | 4/1997 | Augenbraun et al. |
| 5,623,601 A | 4/1997 | Vu |
| 5,633,868 A | 5/1997 | Baldwin et al. |
| 5,636,216 A | 6/1997 | Fox et al. |
| 5,651,002 A | 7/1997 | Van Seters et al. |
| 5,651,058 A | 7/1997 | Hackett-Jones et al. |
| 5,664,228 A | 9/1997 | Mital |
| 5,694,549 A | 12/1997 | Carlin et al. |
| 5,696,898 A | 12/1997 | Baker et al. |
| 5,708,654 A | 1/1998 | Arndt et al. |
| 5,708,655 A | 1/1998 | Toth et al. |
| 5,708,780 A | 1/1998 | Levergood et al. |
| 5,710,883 A | 1/1998 | Hong et al. |
| 5,724,355 A | 3/1998 | Bruno et al. |
| 5,727,159 A | 3/1998 | Kikinis |
| 5,727,950 A | 3/1998 | Cook et al. |
| 5,740,171 A | 4/1998 | Mazzola et al. |
| 5,742,604 A | 4/1998 | Edsall et al. |
| 5,742,668 A | 4/1998 | Pepe et al. |
| 5,742,762 A | 4/1998 | Scholl et al. |
| 5,744,789 A | 4/1998 | Kashi |
| 5,745,884 A | 4/1998 | Carnegie et al. |
| 5,749,075 A | 5/1998 | Toader et al. |
| 5,751,971 A | 5/1998 | Dobbins et al. |
| 5,754,774 A | 5/1998 | Bittinger et al. |
| 5,761,309 A | 6/1998 | Ohashi et al. |
| 5,761,683 A | 6/1998 | Logan et al. |
| 5,768,384 A | 6/1998 | Berson |
| 5,774,535 A | 6/1998 | Castro |
| 5,781,189 A | 7/1998 | Holleran et al. |
| 5,781,550 A | 7/1998 | Templin et al. |
| 5,781,552 A | 7/1998 | Hashimoto |
| 5,781,909 A | 7/1998 | Logan et al. |
| 5,787,483 A | 7/1998 | Jam et al. |
| 5,790,541 A | 8/1998 | Patrick et al. |
| 5,790,800 A | 8/1998 | Gauvin et al. |
| 5,793,763 A | 8/1998 | Mayes et al. |
| 5,793,966 A | 8/1998 | Amstein et al. |
| 5,793,978 A | 8/1998 | Fowler |
| 5,798,706 A | 8/1998 | Kraemer et al. |
| 5,802,320 A | 9/1998 | Baehr et al. |
| 5,802,454 A | 9/1998 | Goshay et al. |
| 5,802,502 A | 9/1998 | Gell et al. |
| 5,805,803 A | 9/1998 | Birrell et al. |
| 5,809,415 A | 9/1998 | Rossmann |
| 5,812,531 A | 9/1998 | Cheung et al. |
| 5,812,776 A | 9/1998 | Gifford |
| 5,822,526 A | 10/1998 | Waskiewicz |
| 5,825,772 A | 10/1998 | Dobbins et al. |
| 5,841,769 A | 11/1998 | Okanoue et al. |
| 5,845,070 A | 12/1998 | Ikudome |
| 5,852,812 A | 12/1998 | Reeder |
| 5,854,901 A | 12/1998 | Cole et al. |
| 5,859,971 A | 1/1999 | Bittinger et al. |
| 5,862,325 A | 1/1999 | Reed et al. |
| 5,862,345 A | 1/1999 | Okanoue et al. |
| 5,864,610 A | 1/1999 | Ronen |
| 5,884,035 A | 3/1999 | Butman et al. |
| 5,889,470 A | 3/1999 | Kaycee et al. |
| 5,893,077 A | 4/1999 | Griffin |
| 5,901,287 A | 5/1999 | Bull et al. |
| 5,909,549 A | 6/1999 | Compliment et al. |
| 5,910,954 A | 6/1999 | Bronstein et al. |
| 5,915,119 A | 6/1999 | Cone |
| 5,918,016 A | 6/1999 | Brewer et al. |
| 5,920,699 A | 7/1999 | Bare |
| 5,936,542 A | 8/1999 | Kleinrock et al. |
| 5,938,726 A | 8/1999 | Reber et al. |
| 5,946,308 A | 8/1999 | Dobbins et al. |
| 5,948,061 A | 9/1999 | Merriman et al. |
| 5,950,195 A | 9/1999 | Stockwell et al. |
| 5,953,398 A | 9/1999 | Hill |
| 5,958,015 A | 9/1999 | Dascalu |
| 5,960,409 A | 9/1999 | Wexler |
| 5,963,915 A | 10/1999 | Kirsch |
| 5,968,176 A | 10/1999 | Nessett et al. |
| 5,970,490 A | 10/1999 | Morgenstern |
| 5,978,387 A | 11/1999 | Sherman |
| 5,979,757 A | 11/1999 | Tracy et al. |
| 5,987,430 A | 11/1999 | van Horne et al. |
| 5,987,498 A | 11/1999 | Athing et al. |
| 5,987,611 A | 11/1999 | Freund |
| 5,991,292 A | 11/1999 | Focsaneanu et al. |
| 5,991,828 A | 11/1999 | Horie et al. |
| 6,003,770 A | 12/1999 | Schilling |

| | | |
|---|---|---|
| 6,006,272 A | 12/1999 | Aravamudan et al. |
| 6,012,088 A | 1/2000 | Li et al. |
| 6,014,698 A | 1/2000 | Griffiths |
| 6,024,440 A | 2/2000 | Murthy et al. |
| 6,026,440 A | 2/2000 | Shrader et al. |
| 6,031,836 A | 2/2000 | Haserodt |
| 6,035,405 A | 3/2000 | Gage et al. |
| 6,041,057 A | 3/2000 | Stone |
| 6,047,051 A | 4/2000 | Ginzboorg et al. |
| 6,047,268 A | 4/2000 | Bartoli et al. |
| 6,052,120 A | 4/2000 | Nahi et al. |
| 6,052,725 A | 4/2000 | McCann et al. |
| 6,055,243 A | 4/2000 | Vincent et al. |
| 6,058,389 A | 5/2000 | Chandra et al. |
| 6,058,429 A | 5/2000 | Ames et al. |
| 6,061,334 A | 5/2000 | Berlovitch et al. |
| 6,061,356 A | 5/2000 | Terry |
| 6,070,187 A | 5/2000 | Subramaniam et al. |
| 6,070,191 A | 5/2000 | Narendran et al. |
| 6,075,776 A | 6/2000 | Tanimoto et al. |
| 6,078,953 A | 6/2000 | Vaid et al. |
| 6,084,528 A | 7/2000 | Beach et al. |
| 6,085,247 A | 7/2000 | Parsons, Jr. et al. |
| 6,094,663 A | 7/2000 | Snow et al. |
| 6,098,172 A | 8/2000 | Coss et al. |
| 6,112,239 A | 8/2000 | Kenner et al. |
| 6,119,160 A | 9/2000 | Zhang et al. |
| 6,119,161 A | 9/2000 | Lita et al. |
| 6,119,162 A | 9/2000 | Li et al. |
| 6,128,601 A | 10/2000 | Van Horne et al. |
| 6,128,664 A | 10/2000 | Yanagidate et al. |
| 6,128,739 A | 10/2000 | Fleming, III |
| 6,130,892 A | 10/2000 | Short et al. |
| 6,134,680 A | 10/2000 | Yeomans |
| 6,138,162 A | 10/2000 | Pistriotto et al. |
| 6,147,995 A | 11/2000 | Dobbins et al. |
| 6,157,925 A | 12/2000 | Jenkins et al. |
| 6,157,946 A | 12/2000 | Itakura et al. |
| 6,161,139 A | 12/2000 | Win et al. |
| 6,167,445 A | 12/2000 | Gai et al. |
| 6,175,867 B1 | 1/2001 | Taghodoss |
| 6,175,869 B1 | 1/2001 | Ahuja et al. |
| 6,181,699 B1 | 1/2001 | Crinion et al. |
| 6,182,141 B1 | 1/2001 | Blum et al. |
| 6,189,030 B1 | 2/2001 | Kirsch et al. |
| 6,208,977 B1 | 3/2001 | Hernandez et al. |
| 6,212,560 B1 | 4/2001 | Fairchild |
| 6,219,694 B1 | 4/2001 | Lazaridis et al. |
| 6,223,205 B1 | 4/2001 | Harchol-Balter et al. |
| 6,226,675 B1 | 5/2001 | Meltzer et al. |
| 6,226,677 B1 | 5/2001 | Slemmer |
| 6,226,752 B1 | 5/2001 | Gupta et al. |
| 6,232,764 B1 | 5/2001 | Rettig et al. |
| 6,233,604 B1 | 5/2001 | Van Horne et al. |
| 6,233,686 B1 | 5/2001 | Zenchelsky et al. |
| 6,236,332 B1 | 5/2001 | Conkright et al. |
| 6,249,527 B1 | 6/2001 | Verthein et al. |
| 6,253,327 B1 | 6/2001 | Zhang et al. |
| 6,256,674 B1 | 7/2001 | Manning et al. |
| 6,286,038 B1 | 9/2001 | Reichmeyer et al. |
| 6,286,039 B1 | 9/2001 | van Horne et al. |
| 6,307,836 B1 | 10/2001 | Jones et al. |
| 6,308,213 B1 | 10/2001 | Valencia |
| 6,310,886 B1 | 10/2001 | Barton |
| 6,317,790 B1 | 11/2001 | Bowker et al. |
| 6,317,837 B1 | 11/2001 | Kenworthy |
| 6,331,983 B1 | 12/2001 | Haggerty et al. |
| 6,338,046 B1 | 1/2002 | Saari et al. |
| 6,339,595 B1 | 1/2002 | Rekhter et al. |
| 6,343,066 B2 | 1/2002 | Magill et al. |
| 6,349,289 B1 | 2/2002 | Peterson et al. |
| 6,353,614 B1 | 3/2002 | Borella et al. |
| 6,370,142 B1 | 4/2002 | Pitcher et al. |
| 6,377,990 B1 | 4/2002 | Slemmer et al. |
| 6,385,653 B1 | 5/2002 | Sitaraman et al. |
| 6,393,468 B1 | 5/2002 | McGee |
| 6,397,255 B1 | 5/2002 | Nurenberg et al. |
| 6,405,258 B1 | 6/2002 | Erimli et al. |
| 6,410,543 B1 | 6/2002 | Strobel et al. |
| 6,418,118 B1 | 7/2002 | Hay et al. |
| 6,424,659 B2 | 7/2002 | Viswanadham et al. |
| 6,425,003 B1 | 7/2002 | Herzog et al. |
| 6,427,174 B1 | 7/2002 | Sitaraman et al. |
| 6,430,621 B1 | 8/2002 | Srikanth et al. |
| 6,434,619 B1 | 8/2002 | Lim et al. |
| 6,434,627 B1 | 8/2002 | Millet et al. |
| 6,453,356 B1 | 9/2002 | Sheard et al. |
| 6,453,361 B1 | 9/2002 | Morris |
| 6,460,084 B1 | 10/2002 | Van Horne et al. |
| 6,463,051 B1 | 10/2002 | Ford |
| 6,463,478 B1 | 10/2002 | Lau et al. |
| 6,466,076 B2 | 10/2002 | Yoshikawa |
| 6,470,385 B1 | 10/2002 | Nakashima et al. |
| 6,487,605 B1 * | 11/2002 | Leung ........................ 709/245 |
| 6,490,620 B1 | 12/2002 | Ditmer et al. |
| 6,496,516 B1 | 12/2002 | Dabecki et al. |
| 6,496,850 B1 | 12/2002 | Bowman-Amuah |
| 6,502,131 B1 | 12/2002 | Vaid et al. |
| 6,505,201 B1 | 1/2003 | Haitsuka et al. |
| 6,510,531 B1 | 1/2003 | Gibbons |
| 6,512,754 B2 | 1/2003 | Feder et al. |
| 6,513,060 B1 | 1/2003 | Nixon et al. |
| 6,526,052 B1 | 2/2003 | Rijhsinghani et al. |
| 6,526,056 B1 | 2/2003 | Rekhter et al. |
| 6,539,395 B1 | 3/2003 | Gjerdingen et al. |
| 6,539,422 B1 | 3/2003 | Hunt et al. |
| 6,539,431 B1 | 3/2003 | Sitaraman et al. |
| 6,549,516 B1 | 4/2003 | Albert et al. |
| 6,563,793 B1 | 5/2003 | Golden et al. |
| 6,567,405 B1 | 5/2003 | Borella et al. |
| 6,591,306 B1 | 7/2003 | Redlich |
| 6,597,693 B1 | 7/2003 | Leung |
| 6,598,167 B2 | 7/2003 | Devine et al. |
| 6,601,065 B1 | 7/2003 | Nelson et al. |
| 6,609,153 B1 | 8/2003 | Salkewicz |
| 6,615,212 B1 | 9/2003 | Dutta et al. |
| 6,615,215 B1 | 9/2003 | Petty |
| 6,618,355 B1 | 9/2003 | Gulliford et al. |
| 6,618,398 B1 | 9/2003 | Marchetti et al. |
| 6,625,121 B1 | 9/2003 | Lau et al. |
| 6,636,894 B1 * | 10/2003 | Short et al. ................. 709/225 |
| 6,640,251 B1 | 10/2003 | Wiget et al. |
| 6,654,808 B1 | 11/2003 | Chuah |
| 6,658,625 B1 | 12/2003 | Allen |
| 6,675,208 B1 | 1/2004 | Rai et al. |
| 6,681,330 B2 | 1/2004 | Bradford et al. |
| 6,691,227 B1 | 2/2004 | Neves et al. |
| 6,694,437 B1 | 2/2004 | Pao et al. |
| 6,724,767 B1 | 4/2004 | Chong et al. |
| 6,728,792 B2 | 4/2004 | Wagner |
| 6,728,920 B1 | 4/2004 | Ebersman |
| 6,738,371 B1 | 5/2004 | Ayres |
| 6,742,036 B1 | 5/2004 | Das et al. |
| 6,754,831 B2 | 6/2004 | Brownell |
| 6,775,290 B1 | 8/2004 | Merchant et al. |
| 6,779,118 B1 | 8/2004 | Ikudome et al. |
| 6,785,730 B1 | 8/2004 | Taylor |
| 6,795,856 B1 | 9/2004 | Bunch |
| 6,826,694 B1 | 11/2004 | Dutta et al. |
| 6,829,239 B1 | 12/2004 | Bhatia et al. |
| 6,856,676 B1 | 2/2005 | Pirot et al. |
| 6,857,009 B1 | 2/2005 | Ferreria et al. |
| 6,868,399 B1 | 3/2005 | Short et al. |
| 6,937,597 B1 | 8/2005 | Rosenberg et al. |
| 6,993,595 B1 | 1/2006 | Luptowski et al. |
| 7,017,046 B2 | 3/2006 | Doyle et al. |

| | | | |
|---|---|---|---|
| 7,020,681 | B1 | 3/2006 | Ayyagari et al. |
| 7,043,532 | B1 | 5/2006 | Humpleman et al. |
| 7,047,415 | B2 | 5/2006 | Doyle et al. |
| 7,086,085 | B1 | 8/2006 | Brown et al. |
| 7,088,727 | B1 | 8/2006 | Short et al. |
| 7,194,554 | B1 * | 3/2007 | Short et al. ................. 709/246 |
| 7,210,035 | B2 | 4/2007 | Doyle et al. |
| 2001/0012282 | A1 | 8/2001 | Yegoshin |
| 2001/0047392 | A1 | 11/2001 | Murphy, Jr. et al. |
| 2002/0097674 | A1 | 7/2002 | Balabhadrapatruni et al. |
| 2002/0116502 | A1 | 8/2002 | Iyer et al. |
| 2002/0116523 | A1 | 8/2002 | Warrier et al. |
| 2002/0133412 | A1 | 9/2002 | Oliver et al. |
| 2002/0152311 | A1 | 10/2002 | Veltman et al. |
| 2003/0061619 | A1 | 3/2003 | Giammaressi |
| 2003/0204756 | A1 | 10/2003 | Ransom et al. |

FOREIGN PATENT DOCUMENTS

| | | |
|---|---|---|
| CA | 2 296 937 | 7/2000 |
| EP | 0 560 706 A2 | 9/1993 |
| EP | 0 762 707 | 3/1997 |
| EP | 0848338 | 6/1998 |
| EP | 0889418 | 1/1999 |
| EP | 0 909 073 | 4/1999 |
| EP | 0 917 318 A2 | 5/1999 |
| EP | 0 924 913 A1 | 6/1999 |
| EP | 0986230 | 3/2000 |
| JP | 5-344122 | 12/1993 |
| JP | 7-66809 | 3/1995 |
| JP | 8-65306 A | 3/1996 |
| JP | 8-242231 A | 9/1996 |
| JP | 09305514 A | 11/1997 |
| JP | 11-177626 | 7/1999 |
| JP | 2000-111870 A | 4/2000 |
| JP | 2000-354127 A | 12/2000 |
| WO | WO 95/27942 A1 | 10/1995 |
| WO | WO 96/39668 | 12/1996 |
| WO | WO 97/11429 A1 | 3/1997 |
| WO | WO 98/11702 A1 | 3/1998 |
| WO | WO 98/12643 | 3/1998 |
| WO | WO 98/16036 A1 | 4/1998 |
| WO | WO 98/16044 | 4/1998 |
| WO | WO 98/36587 A2 | 8/1998 |
| WO | WO 98/40990 A1 | 9/1998 |
| WO | WO 98/54868 A1 | 12/1998 |
| WO | WO 98/57465 A1 | 12/1998 |
| WO | WO 99/01819 A1 | 1/1999 |
| WO | WO 99/15995 A1 | 4/1999 |
| WO | WO 99/55056 A1 | 10/1999 |
| WO | WO 99/57837 A2 | 11/1999 |
| WO | WO 99/57865 | 11/1999 |
| WO | WO 99/57866 | 11/1999 |
| WO | WO 99/65183 A2 | 12/1999 |
| WO | WO 99/66400 | 12/1999 |
| WO | WO 01/03011 A2 | 1/2001 |
| WO | WO 01/30130 A2 | 5/2001 |
| WO | WO 02/067531 A1 | 8/2002 |

OTHER PUBLICATIONS

Amended Complaint, Demand for Jury Trial; *IPE Networks, Inc. vs. Nomadix, Inc.*; Case No. 04 CV 1485 DMS (POR); 48 pages; Sep. 20, 2004; United States District Court, Southern District of California.

Answer and Counterclaims of Nomadix Inc. to the Amended Complaint;*IPE Networks, Inc. vs. Nomadix, Inc.*; Case No. 04 CV 1485 DMS (POR); 44 pages; Filed Oct. 21, 2004; United States District Court, Southern District of California.

Plaintiff/Counter-Defendant IPE Networks Inc.'s Reply to Defendant Nomadix, Inc.'s Counterclaim; *IPE Networks, Inc. vs. Nomadix, Inc.*; Case No. 04 CV 1485 DMS (POR); 8 pages; Nov. 15, 2004; United States District Court, Southern District ofCalifornia.

David C. Plummer; *An Ethernet Address Resolution Protocol or Converting Network Protocol Addresses to 48.bit Ethernet Address for Transmission on Ethernet Hardware*; Nov. 1982; 8 pages; Network Working Group, Request for Comments 826.

Charles Hornig; *A Standard for the Transmission of IP Datagrams over Ethernet Networks*; Apr. 1984; 3 pages; Network Working Group, Request for Comments 894.

J. Postel; *Multi-Lan Address Resolution*; Oct. 1984; 14 pages; Network Working Group, Request for Comments 925.

R. Braden, J. Postel; *Requirements for Internet Gateways*; Jun. 1987; 50 pages; Network Working Group, Request for Comments 1009.

Smoot Carl-Mitchell, John S. Quarterman; *Using ARP to Implement Transparent Subnet Gateways*; Oct. 1987; 8 pages; Network Working Group, Request for Comments 1027.

P. Mockapetris; *Domain Names—Concepts and Facilities*; Nov. 1987; 49 pages; Network Working Group, Request for Comments 1034.

R. Droms; *Dynamic Host Configuration Protocol*; Oct. 1993; 35 pages; Network Working Group, Request for Comments 1531.

K. Egevang, P. Francis; *The IP Network Address Translator (NAT )*; May 1994; 9 pages; Network Working Group, Request for Comments 1631.

M. Chatel; *Classical Versus Transparent IP Proxies*; Mar. 1996; 32 pages; Network Working Group, Request for Comments 1919.

T. Berners-Lee, F. Fielding, H. Frystyk; *Hypertext Transfer Protocol—HTTP/1.0*; May 1996; 54 pages; Network Working Group, Request for Comments 1945.

Ari Luotonen, Kevin Altis; *World-Wide Web Proxies*; Apr. 1994; 8 pages.

John N. Stewart; *Working with Proxy Servers*; Mar. 1997; pp. 19-22; *WebServer Magazine*.

D. Wessels; *Squid Proxy Server Configuration File 1.93.2.2, "TAG deny$_{info}$"*; Mar. 1997; 19 pages; available at <http://www.squid-cache.org/mail-archieve/squid-users/199703/att-0250/squid.conf>; (visited Feb. 1, 2005).

Cord Beerman; *Re: Support for cern like Pass/Fair proxy limits?* ; 2 pages; available at <http://www.squid-cache.org/mail-archieve/squid-users/199611/0385.html> (visited Feb. 1, 2005).

Information Sciences Institute; *Internet Protocol, DARPA Internet Program, Protocol Specification*; Sep. 1981; 45 pages; available at <http://www.faqs.org/rfcs/rfc791.html> (visited Feb. 1, 2005).

Doug MacEachern; *Apache/Perl Integration Project*; README; 2 pages; available at <http://apache/perl.org> , <http://outside.organic.com/mail-archives/modperl>, and <http://www.ping.de/~fdc/mod_perl>.

Gisle Aas, Doug MacEachern; *Apache.pm*; 18 pages; available at <http://www.apache.org/docs>.

*Mod perl.c*; Copyright;1995-1997 The Apache Group; 20 pages.

Plaintiff IP3 Networks Inc.'s Responses to Defendant Nomadix, Inc.'s First Set of Interrogatories (Nos. 1-5); *IP3 Networks, Inc. vs. Nomadix, Inc.; Nomadix, Inc.; Nomadix, Inc. vs. IP3 Networks, Inc.*; Case No. 04 CV 1485 BTM (POR); 17 Pages; Feb. 22, 2005; United States District Court, Southern District of Calinfornia.

Cisco; Single-User Network Access Security TACACS+; Mar. 30, 1995; 9 pages; *Cisco White Paper*; XP002124521.

D. Brent Chapman, Elizabeth D. Zwicky;*Building Internet Firewalls*; Nov. 1995; pp. 131-188; O'Reilly; XP002202789.

Susan Hinrichs; *Policy-Based Management Bridging the Gap*; Dec. 6, 1999; pp. 209-218; Computer Security Applications Conference, 1999 (ACSAC 1999), Proceedings, 15th Annual Phoenix, Arizona, USA Dec. 6-10, 1999, Los Alamitos, California; IEEE Comput. Soc.; XP010368586.

USG Product Timeline, Nomadix, Inc., 2701 Ocean Park Blvd., Suite 231, Santa Monica, California 90405.

Universal Subscriber Gateway, Nomadix, Inc., 2701 Ocean Park Blvd., Suite 231, Santa Monica, California 90405.

Schoen et al., Convergence Between Public Switching and the Internet, published Sep. 21, 19997 in *World Telecom Congress Proceedings*, pp. 549-560.

Complaint for Patent Infringement of U.S. Patent Nos. 6,130,892; 7,088,727; 6,636,894; 6,857,009 and 6,868,399.

U.S. Appl. No. 60/084,014, filed May 4, 1998; in re: Ikudome; entitled "User Specific Automatic Web Redirection System".

Atreus Systems Corporations and B2B Connect, In. Partner to Deliver Bundled Broadband Services to Mult-Tenant, High Ri Buildings, Feb. 14, 2000, Business Wire.

NetGame Ltd. Announces its High-Speed, In-Room Hotel Internet Access Product to be Displayed at HITEC 99, Jun. 16, 1999, Business Wire.

Copper Mountain Introduces CopperPowered Hotel Initiative to Deliver Cost-effective Always-on or Usage-based Broadband Access to Hotel Guests, Dec. 6, 1999, Business Wire.

Nomadix Joins Copper Mountain Networks to Provide High-Speed Internet Access to Hotels Guests, Dec. 6, 1999, Business Wire.

Ascend Communications and ATCOM/INFO Announce Development Alliance, Jun. 22, 1999, Business Wire.

PCT International Search Report dated Jun. 15, 2001 for International Application No. PCT/US 00 28541, filed Oct. 16, 2000; Applicant—Nomadix, Inc., et al.

N. Fujino, et al.; "Mobile Information Service Based on Multi-Agent Architecture," IEICE Transactions on Communications, J.P. Institute Electronics Information and Comm., Eng., Tokyo, vol. E80-B, Oct. 1997.

R. Sietmann; "*Tarifmodelle Gegen Staus Auf Der Infobahn*,"Funkschau, De, Franzis-Verlag K.G. Munchen, vol. 71, Nr. 8, Apr. 1998.

Plaintiff's Reply to Defendant's First Amended Answer and Counterclaims, Demand for Jury Trial, Case No. CV07-1946 DDP (VBKx), *Nomadix Inc. v. Second Rule LLC et al.*; 6 pages; Filed Jul. 31, 2007, United States District Court, Central District of CA, Western Division.

First Amended Answer, Affirmative Defenses and Counterclaims of Second Rule LLC, Civil Action No. CV 07 1946 GPS (VBKx), *Nomadix, Inc.* vs. *Second Rule LLC*; 15 pages, dated Jul. 16, 2007, United States District Court, Central District of CA.

Denning et al.; Location-Based Authentication: Grounding Cyberspace for Better Security, copy right 1996, Elsevier Science Ltd., pp. 1-6.

G. Malkin; Dial-in Virtual Private Networks Using Layer 3 Ttunneling; Proceedings of the Conference on Local Computer Networks, XX, XX; Nov. 2, 1997; pp. 555-561; XP002084438.

Layer 2 Tunneling Protocol; Internet, Online!; XP002175644; Retrieved from the Internet: URL:www.cisco.com (retrieved on Aug. 22, 2001); 1998; Cisco Systems, Inc.

Detailed Scenario for Access VPDN Dial-in Using L2TP; Internet, Online!; XP002175644; URL:www.cisco.com (retrieved on Aug. 22, 2001); 1998; p. 1, figure 4, table 1.

M. Shreedhar et al.; Efficient Fair Queuing Using Deficit Round Robin; *Proceedings of the International Workshop on Community Networking*; XX, XX, Aug. 1, 1995; pp. 231-242; XP000541659.

Cisco Systems, Inc.; *Interface Queue Management* (white paper); "Online!"; Aug. 3, 1995; 12 pages; INET; XP002210177; available at <URL: http://www.cisco.com/warp/public/614/16.html> (retrieved on Aug. 16, 2002).

B. Braden et al.; RFC2309 *Recommendations on Queue Management and Congestion Avoidance in the Internet*, Apr. 1998; 13 pages; "Online!" IETF, INET XP002210176; available at <URL:http://www.faqs.org/rfcs/rfc2309.html> (retrieved on Aug. 16, 2002).

C. Rigney, *Radius Accounting*, Network Working Group, Request for Comments: 2139, Apr. 1997.

Ascend Communications Inc., Virtual Private Networks, 1997.

Airamo, Virtual Private Networks, 1997.

PCT International Search Report dated Mar. 14, 2001 relating to PCT/US 00/29172.

P. Srisuresh et al.; *Traditional IP Network Address Translator (Traditional NAT)*; Jan. 2001; 16 pages; The Internet Society; XP-002227044.

M. Smith et al.; *Network Security Using NAT and NAPT*; Aug. 2002; pp. 355-360; 10th IEEE International Conference; XP-002246149.

A. Michard et al.; The Aquarelle resource discovery system; *Computer Networks and ISDN Systems*; 1998; pp. 1185-1200; vol. 30, NR. 13; North Holland Publishing; Amsterdam, NL; XP004147404; ISSN: 0169-7552.

T. Yokoi et al.; Internet Quality & Traffic Management (III), The Journal of the Institute of Electronics, Information and Communication Engineers, 2000, Jan. 2005, vol. 83, No. 1, pp. 57-63.

R. J. Edell et al., "Billing using and pricing for TCP", IEEE Journal on selected areas in communications, US, IEEE Inc. New York, vol. 13, NR. 7, pp. 1162-1175; XP000525655; ISSN: 0733-8716.

Plaintiff/Counter-Defendant IP3 Networks Inc.'s Reply to Defendant Nomadix, Inc.'s Counterclaim; *IP3 Networks Inc.* vs. *Nomadix Inc.*; Case No. 04 Cv 1485 DMS (POR); 8 pages; Filed Nov. 15, 2004; US District Court, Southern District of California.

ATCOM/INFO and Microsoft Plan Large-Scale Deployment of IPORT for Mid-1998, available at http://www.microsoft.com/presspass/press/1998/mar98/ipttrlpr.mspx, dated Nov. 14, 2007, 4 pages.

Hotel Online Special Report, Internet Access for the Road Warrior Easier Than Ever IPORT™ Version 2.0 Released, available at http://www.hotel-online.com/News/PressReleases1998_3rd/July98_IPORTAccess.html, dated Nov. 14, 2007, 2 pages.

Internet Access: ATCOM/INFO Releases IPORT Central Office Solution. IPORT-CO Makes Plug & Play High-Speed Internet Access Possible to Multiple Properties from a Single Server . . . , available at http://findarticles.com/p/articles/mi_m0UNZ/is_ 1998_Oct_26/ai_53126579, dated Nov. 14, 2007, 3 pp.

*Make users go thru login*, Available at http://www.microsoft.public.inetserver.iis.activeserverpages.html (visited Oct. 5, 2005 but including items dated Jan. 19, 1998).

U.S. Appl. No. 08/816,174, filed Mar. 12, 1997; In re: J. E. Short; Title: Nomadic Router.

*[Proposed ] Joint Claim Construction Statement, Nomadix, Inc. vs. Second Rule LLC*; Civil Action CV-07-1946, USDC, CD CA.; Jul. 2, 2008; 105 pages.

*Plaintiff Nomadix, Inc.'s Reply Claim Construction Brief; Nomadix, Inc. vs. Second Rule LLC*; Civil Action CV07-1946 USDC, CDCA WD; Aug. 22, 2008; 277 pages.

*Declaration of* Don P. Foster *Re. Second Rule LLC's Opening claim Construction Brief, Nomadix, Inc. vs. Second Rule LLC*; Civil Action CV07-1946 USDC, CDCA WD; Aug. 4, 2008; Part 1, 227 pages; Part 2, 230 pages.

*Defendant's Opening Claim Construction Brief, Nomadix, Inc. vs. Second Rule LLC*; Civil Action CV07-1946 USDC, CDCA WD; Aug. 4, 2008; 54 pages.

*Plaintiff's Opening Claim Construction Brief [Redacted Public Version]; Nomadix, Inc. vs. Second Rule LLC*; Civil Action CV07-1946 USDC, CDCA WD; Aug. 4, 2008; 237 pages.

*Defendant's Reply to Plaintiff's Opening Claim Construction Brief; Nomadix, Inc. vs. Second Rule LLC*; Civil Action CV07-1946 USDC, CDCA WD; Aug. 22, 2008; 44 pages.

W. Richard Stevens, "TCP/IP Illustrated vol. 1: The Protocols," 1994, 53-62, Addison Wesley.

Andrew S. Tanenbaum, "Computer Nextworks," 1996, 420-42, $3^{rd}$ ed.

* cited by examiner

Nomadic Router Automatic Adaptation to Host Device host hub bridge/switch router firewall proxy/gateway Nomadic Router

SYSTEMS AND METHODS FOR PROVIDING DYNAMIC NETWORK AUTHORIZATION, AUTHENTICATION AND ACCOUNTING

CROSS-REFERENCE TO RELATED APPLICATIONS

This application is a continuation of U.S. patent application Ser. No. 09/693,060, filed on Oct. 20, 2000, now U.S. Pat. No. 7,194,554, which is a continuation-in-part of U.S. patent application Ser. No. 09/458,569, filed Dec. 8, 1999, now of U.S. Pat. No. 6,636,894 titled "Systems And Methods For Redirecting Users Having Transparent Computer Access To A Network Using A Gateway Device Having Redirection Capability", which claims the benefit of the filing date and priority to U.S. Provisional Application Ser. No. 60/111,497 filed on Dec. 8, 1998. U.S. patent application Ser. No. 09/693,060 is also a continuation-in-part of U.S. application Ser. No. 09/458,602, filed Dec. 8, 1999, titled "Systems and Methods For Authorizing, Authenticating and Accounting Users Having Transparent Computer Access To A Network Using A Gateway Device," U.S. application Ser. No. 09/693,060 also claims the benefit of U.S. Provisional Application Ser. No. 60/161,182, filed Oct. 22, 1999, titled "Systems and Methods for Dynamic Bandwidth Management on a Per Subscriber Basis in a Computer Network," U.S. Provisional Application Ser. No. 60/160,890, filed Oct. 22, 1999, titled "Systems and Methods for Creating Subscriber Tunnels by a Gateway Device in a Computer Network," U.S. Provisional Application Ser. No. 60/161,139, filed Oct. 22, 1999, titled "Information And Control Console For Use With A Network Gateway Interface," U.S. Provisional Application Ser. No. 60/161,189, filed Oct. 22, 1999, titled "Systems and Methods for Transparent Computer Access and Communication with a Service Provider Network Using a Network Gateway Device," U.S. Provisional Application Ser. No. 60/160,973, filed Oct. 22, 1999, titled "Systems and Methods for Enabling Network Gateway Devices to Communicate with Management Systems to Facilitate Subscriber Management," U.S. Provisional Application Ser. No. 60/161,181, filed Oct. 22, 1999, titled "Gateway Device Having an XML Interface and Associated Method," and U.S. Provisional Application Ser. No. 60/161,093, filed Oct. 22, 1999, titled "Location-Based Identification and Authorization for use With a Gateway Device." All of the above applications are incorporated by reference in their entirety.

FIELD OF THE INVENTION

The present invention relates generally to systems and methods for controlling network access, and more particularly, to systems and methods for establishing dynamic user network access.

BACKGROUND OF THE INVENTION

User access to computer networks has traditionally been based upon a two step authentication process that either provides a user total network access, or refuses the user any access whatsoever. In the first step of the process, a user establishes a communication link with a network via a telephone line, dedicated network connection (e.g., Broadband, Digital Signal Line (DSL)), or the like. In the second step of the authentication process, the user must input identification information to gain access to the network. Typically, the input identification information includes a user name and password. Using this information, the network or service provider verifies that the user is entitled to access the network by determining whether the identification information matches subscriber information contained in a subscriber table (or database) that stores identification information for all users authorized to access the network. Where user input information matches subscriber data in the subscriber table, the user is authorized to access any and all services on the network. On the other hand, if the user input identification information fails to match subscriber data in the table, the user will be denied access to the network. Thus, once a user's identity is compared to data stored within a subscription table, the user is either entitled network access, or denied access altogether. Furthermore, where the user is authorized access to the network, the user is typically authorized to access any destination accessible via the network. Therefore, conventional authentication of users is based on an all-or-nothing approach to network access.

In many conventional network access applications, such as in conventional Internet access applications, the subscriber database (or table) not only stores data corresponding to the identity of subscribers authorized to access the network, but also stores information that can vary based upon the particular subscriber. For instance, the subscriber database can include subscriber profiles that indicate the type of access a subscriber should receive, and other related information, such as the fees due by the subscriber for network access. Although information in the subscriber database may vary from user to user, information unique to the database is generally used for billing or network maintenance purposes. For instance, conventional subscriber databases typically include data such as the cost the subscriber is paying for network access, and the amount of time the subscriber has accessed the network. Thus, where a subscriber to an Internet Service Provider (ISP) has purchased Internet access, a source profile database may contain information that enables a user to be authenticated and tracks the user's access for accounting purposes, such as maintaining a log of the user's time on the network.

Additionally, in conventional network access systems, in order for a user to connect to on-line services (e.g., the Internet), the user must install client side software onto the user's computer. Client side software is typically provided by a network administrator or network access provider, such as an ISP with whom the user has subscribed for Internet access, and enables the client to configure his or her computer to communicate with that network access provider. Continuing with the illustrative example of a user accessing the Internet via an ISP, the user must install ISP software on the client computer, and thereafter establish an account with the ISP for Internet access. Typically, a user subscribes to an ISP, such as America Online™, Earthlink™, Compuserve™ or the like, by contracting directly with the ISP for Internet access. Usually, the user pays for such Internet access on a monthly fixed fee basis. Regardless of the user's location, the user may dial up an access number provided by the ISP and obtain Internet access. The connection is often achieved via a conventional telephone modem, cable modem, DSL connection, or the like.

Because users accessing networks through conventional methods, such as through ISPs, are either allowed or denied access to a network in an all or nothing approach, users cannot be dynamically authorized access to a network such that the user's access and authorization to particular networks or sites is customizable. What is needed is a method and system that allows users dynamic and customizable access that may vary based upon any number of variables associated with a user, such as a user location, user name or password, user computer, or other attributes. For example, it would be advantageous for some users to be authorized access to all Internet sites, while others may be denied access to particular sites. In addition to authorizing user access to a network, it would be advantageous for a network, such as an ISP or enterprise network, to selectively permit users a range of authorization, such that the user's access is not based upon an all or nothing approach.

In addition, user digital communications addresses such as internet or IP addresses are conventionally associated with a fixed physical location, such as a user's business telephone line. However, portable communications devices such as laptop computers are becoming increasingly popular, and it is common for a user to access the internet from locations as diverse as hotel rooms and airplanes.

Digital communications networks are set up to route communications addressed to a communication address to the associated physical location. Thus, if a laptop computer is connected to a remote location, communications to and from the computer will not be associated with the user's communications address.

In order for a computer (host) to communicate across a network (e.g., the internet), software protocols (e.g., Transport Control Protocol/Internet Protocol (TCP/IP)) must be loaded into the host. A host computer sends information (i.e., packets of data) to devices on the network (routers) which receive the packets and send the packets back to the destination host.

The destination host will route replies back using a similar process. Each host computer and router must be configured so it will know who to send the packets of data to. A router will receive the packets only if the host computers specifically send (address) the packets to that router. If a host is configured incorrectly (bad address), then the host computer and router will be unable to communicate.

With the advent of mobile computers (laptops) and the desire to plug them into various networks to gain access to the resources on the network and internet, a mobile computer must be configured for each network it plugs into. Traditionally this new configuration can be done either (i) manually in software on the mobile computer (usually causing the mobile computer to be restarted to load in the new configuration), or (ii) with a new set of protocols which must be utilized on the mobile computer to obtain the configuration information from a device on the network to which the computer is being connected. When new services (protocols) are created to add functionality to the host computers, these new protocols must be updated in the host computers or routers, depending upon the type of new functionality being added.

SUMMARY OF THE INVENTION

The present invention includes a method and system for selectively implementing and enforcing Authentication, Authorization and Accounting (AAA) of users accessing a network via a gateway device. According to the present invention, a user may first be authenticated to determine the identity of the user. The authentication capability of the system and method of the present invention can be based upon a user ID, computer, location, or one or more additional attributes identifying a source (e.g., a particular user, computer or location) requesting network access. Once authenticated, an authorization capability of the system and method of the present invention is customized based upon the identity of the source, such that sources have different access rights based upon their identity, and the content and/or destination requested. For instance, access rights permit a first source to access a particular Internet destination address, while refusing a second source access to that same address. In addition, the authorization capability of the system and method of the present invention can be based upon the other information contained in the data transmission, such as a destination port, Internet address, TCP port, network, or similar destination address. Moreover, the AAA of the present invention can be based upon the content type or protocol being transmitted. By authenticating users in this manner, each packet can be filtered through the selective AAA process, so that a user can be identified and authorized access to a particular destination. Thus, each time the user attempts to access a different destination, the user is subject to the AAA, so that the user may be prevented access from a particular site the AAA system and method deem inaccessible to the user based upon the user's authorization while permitting access to other sites that the AAA method and system deem accessible. Additionally, according to one embodiment of the invention, source access to the network may be tracked and logged by the present invention for accounting and historical purposes.

According to one embodiment of the invention, there is disclosed a method for selectably controlling and customizing source access to a network, wherein the source is associated with a source computer, and wherein the source computer has transparent access to the network via a gateway device and no configuration software need be installed on the source computer to access the network. The method includes receiving at the gateway device a request from the source computer for access to the network, identifying an attribute associated with the source based upon a packet transmitted from the source computer and received by the gateway device, and accessing a source profile corresponding to the source and stored in a source profile database, wherein the source profile is accessed based upon the attribute, and wherein the source profile database is located external to the gateway device and in communication with the gateway device. The method also includes determining the access rights of the source based upon the source profile, wherein access rights define the rights of the source to access the network.

According to one aspect of the invention, determining the access rights of the source based upon the source profile includes determining the access rights of the source based upon the source profile, wherein the access rights define the rights of the source to access a requested network destination. According to another aspect of the invention, the method includes assigning a location identifier to the location from which requests for access to the network are transmitted, and the location identifier is the attribute associated with the source. Furthermore, according to the invention, accessing a source profile corresponding to the source can include accessing a source profile stored in a source profile database, where the source profile database includes a remote authentication dial-in user service (RADIUS), or a lightweight directory access protocol (LDAP) database.

According to yet another aspect of the invention, the method includes updating the source profile database when a new source accesses the network. Additionally, the method can include maintaining in the source profile database a historical log of the source's access to the network. Moreover, the attribute associated with the source can be based upon a MAC address, User ID or VLAN ID associated with the source computer from which the request for access to the network was transmitted. According to yet another aspect of the invention, receiving at the gateway device a request from a source for access can include the step of receiving a destination address from the source.

According to another embodiment of the invention, there is disclosed a system for selectably controlling and customizing access, to a network, by a source, where the source is associated with a source computer, and wherein the source computer has transparent access to the network via a gateway device and no configuration software need be installed on the source computer to access the network. The system includes a gateway device for receiving a request from the source for access to the network, and a source profile database in communication with the gateway device and located external to the gateway device, wherein the source profile database stores access information identifiable by an attribute associated with the source, and wherein the attribute is identified based upon a data packet transmitted from the source computer and received by the gateway device. The system also includes a AAA server in communication with the gateway device and source profile database, wherein the AAA server determines if the source is entitled to access the network based upon the access information stored within the source profile database, and wherein the AAA server determines the access rights of the source with the access rights defining the rights of the source to access destination sites via the network.

According to one aspect of the invention, the packet received by the gateway device includes at least one of VLAN ID, a circuit ID, and a MAC address. Additionally, according to another aspect of the invention, the source profile database includes a remote authentication dial-in user service (RADIUS) or a lightweight directory access protocol (LDAP) database. Furthermore, the source profile database can include a plurality of source profiles, wherein each respective source profile of the plurality of source profiles contains access information. According to the invention, each respective source profile can also contain historical data relating to the duration of network access for use in determining the charges due for the network access. According to yet another aspect of the invention, the source profile database can be located within the AAA server.

According to another embodiment of the present invention, there is disclosed a method for redirecting a source attempting to access a destination through a gateway device, wherein source is associated with a source computer, and wherein the gateway device enables the source to communicate with a network without requiring the source computer to include network software configured for the network. The method includes receiving at the gateway device a request from the source to access the network, identifying the source based upon an attribute associated with the source, and accessing a source profile database located external to the gateway device, where the source profile database stores access rights of the source. The method further includes determining the access rights of the source based upon the identification of the source, wherein the access rights define the rights of the source to access destination sites via the network.

According to one aspect of the invention, accessing a source profile database includes accessing a source profile database that includes a remote authentication dial-in user service (RADIUS), or a lightweight directory access protocol (LDAP) database. According to another aspect of the invention, the method can include assigning a location identifier to the location from which requests for access to the network are transmitted, wherein the location identifier is the attribute associated with the source. The method can also include updating the source profile database when a new source accesses the network, and maintaining in an accounting database a historical log of the source's access to the network, wherein the accounting database is in communication with the source profile database.

According to yet another aspect of the invention, receiving at the gateway device a request from a source for access can include the step of receiving a destination address from the source. Moreover, determining if the source computer is entitled to access the destination address can further include denying the source computer access where the source profile indicates that the source computer is denied access. Determining if the source is entitled to access the network can also further include directing the source to a login page when the source profile is not located within the source profile database.

According to yet another embodiment of the invention, there is disclosed a system for enabling transparent communication between a computer and a service provider network. The system includes a computer, and a network gateway device in communication with the computer for connecting the computer to a computer network, where the network gateway device receives source data that represents a user attempting to access said computer network. The system also includes a service provider network in communication with the network gateway device, where the service provider network includes an authentication server located external to the network gateway device and in communication with the network gateway device. The authentication server has therein a source profile database comprising source profiles that represent users authorized to access said computer network, and compares the source data to said source profiles to determine if the user attempting to access the computer network can access the computer network.

According to one aspect of the invention, the system can include an accounting system for maintaining historical data concerning use of the service provider network. According to another aspect of the invention, the authentication server includes a remote authentication dial-in user service (RADIUS), or a lightweight directory access protocol (LDAP) database. Furthermore, the source profile database can include a plurality of source profiles, where each respective source profile of the plurality of source profiles contains access information. According to yet another aspect of the invention, the source data includes an attribute associated with the computer and transmitted from the computer to the gateway device. According to anther aspect of the invention, the source data includes login information associated with a respective user.

The Authentication, Authorization and Accounting method and system according to the present invention enable users transparent access to a computer network employing a gateway device. Therefore, each user may have differing rights to access services, sites or destinations via the network. Thus, the present invention differs from conventional AAA methods and systems by offering dynamic AAA services which authenticate users and offer those users varying degrees of authorization to utilize the accessed network. Furthermore, the source profile database of the present invention can be located external to the gateway device, and on a network non-local to the network from which access is requested. An external source profile database is desirable because each gateway device allows a finite number of users to access the network, so that multiple gateway devices may be required. Additionally, administering and maintaining one consolidated database of authentication data is easier than multiple smaller databases. Moreover, locating the database external to the local network allows an ISP or third party provider to maintain the confidentiality of the information stored within the database and maintain and control the database in any manner the third party provider so desires.

The present invention also comprises a method and system for redirecting users to a portal page where users have transparent access to a computer network utilizing a gateway device. The method and system advantageously operates in a manner transparent to the user since the user need not reconfigure their computer and no additional software need be added to the computer for reconfiguration purposes.

According to the invention, users accessing the gateway device are redirected to a portal page. Where stored user profiles permit the users access to the destination network, the users can be forwarded to the destination network or a portal page established by the network, user, or another entity. Otherwise, users are directed to a login page in which the users must input user information so that the users can obtain access to networks and online services. The redirection function according to the present invention can be utilized to direct new or existing users to customized homepages established by the gateway device or individual users.

A method for dynamically creating new users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination network, determining if the user is entitled access to the destination network based upon a user profile corresponding to the user and stored within a user profile database in communication with the gateway device, and redirecting the user to a login page when the user profile does not include rights to access the destination network. Furthermore, the method of the present invention can include the step of forwarding the user to the destination network when the user profile includes rights to access the destination network. The method can also include the step of automatically redirecting the user to a portal page following receipt of a request for access to the destination network prior to determining if the user is entitled access to the destination network.

According to one aspect of the invention, the method can include the step of establishing a login page on a webserver local to the gateway device prior to redirecting the user to the login page. The method can also include accepting user information at the login page which is thereafter utilized by the gateway device to authorize the user access to the destination network. The user profile database can be updated with the user information.

According to another aspect of the invention, the user may be forwarded from the login page and returned to a portal page or directed to a destination address which can be an Internet destination address. Redirecting the user to a login page can include redirecting a browser located on the user's computer to the login page. Furthermore, redirecting the browser located on the user's computer can include receiving a Hyper-Text Transfer Protocol (HTTP) request for the destination address and responding with an HTTP response corresponding to the login page.

According to another embodiment of the invention, a system for dynamically creating new users having transparent computer access to a destination network is disclosed, wherein the users otherwise have access to a home network through home network settings resident on the users' computers, and wherein the users can access the destination network without altering the home network settings. The system includes a gateway device for receiving a request from a user for access to the destination network, and a user profile database comprising stored access information and in communication with the gateway device. The system further includes an Authentication, Authorization and Accounting (AAA) server in communication with the gateway device and user profile database, where the AAA server determines if a user is entitled to access the destination network based upon the access information stored within the user profile database, and wherein the AAA server redirects the user to a login page where the access information does not indicate the user's right to access the destination network. The system can also direct the user to a portal page upon the user's access to the network, prior to determining the access rights of the user.

According to one aspect of the invention, the login page is maintained local to the gateway device. The user profile database and AAA server can also be located within the gateway device. Furthermore, the user profile database can be located within the AAA server.

According to another embodiment of the invention, the user profile database includes a plurality of user profiles, wherein each respective user profile of the plurality of user profiles contains access information. In addition, each respective user profile may contain historical data relating to the duration of destination network access for use in determining the charges due for the destination network access.

According to another embodiment of the invention, a method for redirecting users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination address, such as an Internet address, and redirecting the user to a portal page, wherein the user computer remains configured for accessing the home network, and wherein no additional configuration software need be installed on the user's computer. Furthermore, redirecting the user to a portal page can comprise redirecting the user to a portal page created by an administrator associated with the portal page, or redirecting the user to a portal page customized by the user.

According to another embodiment of the invention, a system for redirecting users having transparent computer access to a destination network is disclosed, where the users otherwise have access to a home network through home network settings resident on the users' computers, and wherein the users can access the destination network without altering the home network settings. The system includes a gateway device for receiving a request from a user for access to the destination network, and an AAA server in communication with the gateway device, where the AAA server intercepts the request from the user for access to the destination network and redirects the user to a portal page, wherein the user's computer remains configured for accessing the home network, and wherein no additional configuration software need be installed on the user's computer. According to one aspect of the invention, the AAA server is located entirely within the gateway device. The portal page of the system can also be maintained on a server local to the gateway device.

A unique advantage of the transparent redirection of users to a portal page, and, in certain circumstances from the portal page, to a login page where users subscribe for network access is that a user can obtain access to networks or online services without installing any software onto the user's computer. On the contrary, the entire process is completely transparent to the user. As such, the method and apparatus of the present invention facilitates transparent access to destination networks without requiring a user to reconfigure the home network settings resident on the user computer and without having to install reconfiguration software.

The method and system of the various embodiments facilitate transparent access to a destination network. According to one embodiment, the method and system facilitate the addition of new subscribers to the network. According to another embodiment, all users can be redirected to a portal page, which can include advertising, without requiring reconfiguration of the users' computers, or new software to be added on the users' computers.

According to another embodiment, a portable "Nomadic" router or translator is provided. The nomadic router enables a laptop computer or other portable terminal which is configured to be connected to a local home network to be connected to any location on the internet or other digital data communication system. The nomadic router automatically and transparently re-configures the terminal to its new location and processes outgoing and incoming data:

The nomadic router includes a processor which appears as the home network to the terminal, and appears as the terminal to the communication system. The terminal has a permanent address, the nomadic router has a router address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address.

The terminal can be directly connected to a point on a local network, and the nomadic router connected to another point in the network. The nomadic router can be employed to implement numerous applications including nomadic e-mail, network file synchronizer, database synchronizer, instant network, nomadic internet, mobile virtual private network and trade show router, and can also be utilized as a fixed nomadic router.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router also automatically configures the terminal to utilize a selected one of the interface devices, and switches from one to another if the first device malfunctions or becomes otherwise unavailable.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the users switches when in the office, moving around the office, or on the road (such as at a hotel, airport, or home). The device transparency in the nomadic router provides seamless switching among these devices (easily, transparently, intelligently, and without session loss. The location transparency support in the nomadic router prevents users from having to reconfigure (e.g., IP and gateway address) their network device (laptop) each time they move to a new network or subnetwork.

The present nomadic router provides a separation of location and identity by providing a permanent IP address to the network device (host). The nomadic router provides independence between the location, communication device, and the host operating system. There are no new standards need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The present nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router even when the host computer is not configured to communicate with the nomadic router.

This is achieved by the nomadic router pretending to be the router which the host is configured for, and by the nomadic router pretending to be the host which the router expects to communicate with. Therefore, the nomadic router supports the mobility of computers in that it enables these computers to plug into the network at different locations (*location independence*) without having to install, configure, or utilize any new protocols on the mobile computer.

The mobile computer continues to operate without being aware of the change in location or new configuration, and the nomadic router translates the data allowing the host to think that it is communicating with the router. By putting this process in a self-contained apparatus, the deployment of new protocols can be performed independently of the host computer and its operating system (*host independent*).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a very minimal set of software protocols and functionality (e.g., the minimum functionality typically installed in network computers) to communicate-across the network.

The nomadic router translation ability also enables the use of alternate communication paths (*device independence*) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the network infrastructure so it will already be there when the mobile computer user arrives (e.g., a box which plugs into the local area network translating packets being sent between the host and nomadic router, or a chip which is installed in routers on the network). The nomadic router can also be provided in the form of software which is loaded into and run in the mobile computer or another computer or router on a network.

These and other features and advantages of the present invention will be apparent to those skilled in the art from the following detailed description, taken together with the accompanying drawings, in which like reference numerals refer to like parts.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
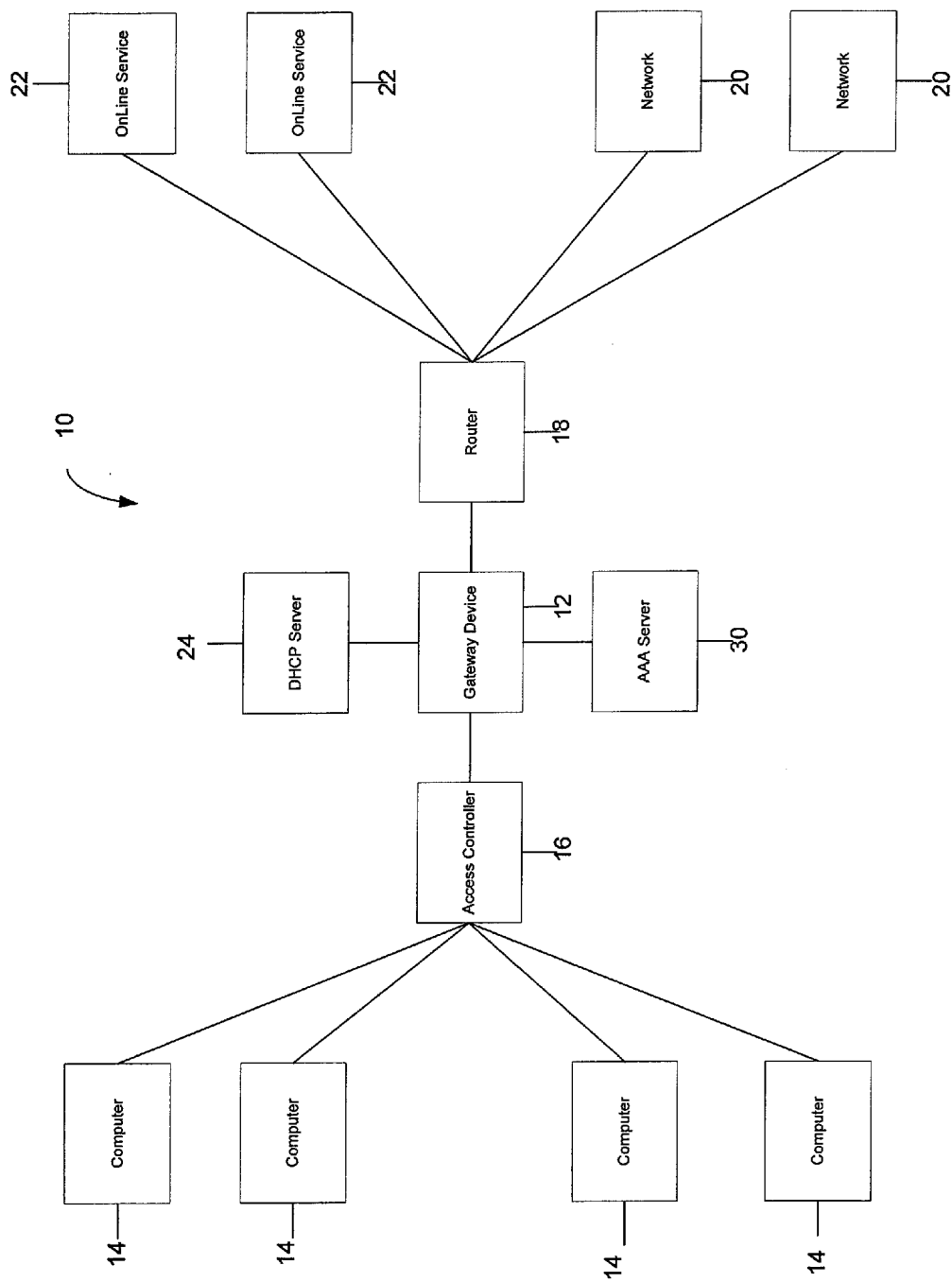
FIG. 1 is a block diagram of a computer system that includes a AAA server for authenticating, authorizing and accounting sources accessing networks and/or online services, according to one embodiment of the present invention.

Referring now to FIG. 1, a computer system 10 is illustrated in block diagram form. The computer system 10 includes a plurality of computers 14 that can communicate with one or more online services 22 or networks via a gateway device 12 providing the interface between the computers 14 and the various networks 20 or online services 22. One embodiment of such a gateway device has been described in U.S. patent application Ser. No. 08/816,174 (referred to herein as the Gateway Device Application), the contents of which are incorporated herein by reference. Briefly, the gateway device 12 facilitates transparent computer 14 access to the online services 22 or networks 22, such that the computers 14 can access any networks via the device 12 regardless of their network configurations. Additionally, the gateway device 12 includes the ability to recognize computers attempting to access a network 12, the location of computers attempting to access a network, the identity of users attempting to gain network access, and additional attributes, as will be discussed below with respect to the dynamic AAA methods and systems of the present invention.

As illustrated in FIG. 1, the computer system 10 also includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end (a Cable Modem Termination Shelf (CMTS)) for signals transmitted via coaxial cables, a wireless access point (WAP) for signals transmitted via a wireless network, a switch, or the like.

The computer system 10 further includes a AAA server 30 that dynamically authenticates and authorizes user access, as explained in detail below, such that users are subjected to a AAA process upon attempting to gain access to a network through the gateway device 12. Finally, as is shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of the networks 20 or online services 22, based upon the user's selection. It will be appreciated by one of ordinary skill in the art that one or more devices illustrated in FIG. 1 may be combinable. For example, although not shown, the router 18 may be located entirely within the gateway device 12.

Users and computers attempting to access a network 20 or online service 22 via the gateway device 12 are referred to hereinafter as sources. According to AAA methods and systems of the present invention, a source attempting to access a network via the gateway device 12 is authenticated based on attributes associated therewith. These attributes can include the identity of a particular user or computer, location through which access is requested, requested network or destination, and the like. As is explained in detail in the Gateway Device Application, these attributes are identified by data packets transmitted to the gateway device 12 from the computers through which access is requested. According to one embodiment, methods and systems of the present invention provide dynamic authentication, authorization and accounting based upon these attributes. Generally, as used herein authentication refers to the identification of the source, authorization refers to the determination of permittable source access, and accounting refers to the tracking of a source's access to a network.

Referring now to the authentication function of systems and methods of present invention, it will be appreciated that authenticating a source attempting to access the network is often crucial to network administration, as network access and services are not typically laid open for all users regardless of identity or payment. As stated above, a source may be identified by the gateway device 12 by one or more attributes contained within data packets transmitted to the device from the computer associated with the source attempting to access a network or service, referred to hereinafter as the source computer. For instance, where the source is a user, the source computer is the computer through which the user is attempting to access a network or network destination. On the other hand, where the source is a computer through which one or more user may request access to a network, the source computer is that computer through which access is requested.

According to one aspect of the invention, a source computer attempting to access a network via the gateway device 12 may be identified one or more attributes that include a circuit ID, MAC address, user name, ID and/or password, or particular location (e.g., a communications port in a hotel room), or the like, transmitted to the gateway device 12 via data packets generated by the source computer, as described in U.S. Provisional Application Ser. No. 60/161,093, titled "Location-Based Identification and Authorization for use With a Gateway Device." It will be appreciated that one or more of these attributes can be used in the present invention to identify the source accessing the network. By means of an illustrative example, where sources are different users having dissimilar authentication and authorization rights, the users may identify themselves by their respective login information (e.g., user name and password) such that they will be independently identified despite the use of the same equipment, such as the same computer. On the other hand, where the source is a computer, diverse users using the computer will have like authentication and authorization rights regardless of the individual rights of each user, as the rights are associated with the computer (e.g., identified by MAC address), rather than with the respective users.

The authentication of sources via an attribute associated with the source is performed by the AAA server 30, illustrated in FIG. 1. The AAA server 30 stores source profiles corresponding to sources identified by the AAA server 30. According to one aspect of the present invention, the AAA server 30 is located entirely within the gateway device 12. According to another aspect of the invention, the AAA server 30 can comprise a plurality of components, at least some of which are external to the gateway device 12, or alternatively, the AAA server 30 can be located entirely external to the gateway device 12. For example, the location of the AAA server 30 may be such that the gateway device 12 communicates with the AAA server 30 via internet protocol. According to one embodiment of the invention, the AAA server 30 can be maintained by an ISP, which identifies sources authorized to communicate with the network via the ISP. Therefore, it will be appreciated that the AAA server 30 may be located at any internet address and stored on any computer accessible via internet protocol.

According to one aspect of the invention, a separate source profile exists for each source accessing the system. Source profiles are maintained in a source profile database, which may be an internal component of the AAA server 30, an external component of the AAA server 30, or a separate component in communication with the AAA server 30. Preferably, the source profile database is located external to the gateway device and network to alleviate administrative burden on the network so that the network does not have to set up and maintain separate authentication databases on each network or gateway device. This is also preferable because each gateway device 12 allows a finite number of users to access the network, which requires multiple gateway devices to accommodate a large number of sources. Secondly, administering and maintaining one consolidated database of authentication data is easier than multiple smaller databases. Lastly, locating the source profile database external to the local network can allow an ISP or third party provider to maintain the confidentiality of the information stored within the database and maintain and control the database in any manner the third party provider so desires.

The source profile includes one or more names, passwords, addresses, VLAN tags, MAC addresses and other information pertinent to identify, and, if so desired, bill, a source. Upon a source's attempt to access a network via the gateway device 12, the AAA server 30 attempts to authenticate the source by comparing stored source profiles in the source profile database with the attributes received from the gateway device 12 or source to determine the source identity. As an illustrative example, where a user attempts to access the network by entering a user ID and password, the user ID and password are compared against all IDs and passwords stored in the source profile database to determine the identity of the user. As such, the source profile database generally comprises a database or data storage means in communication with processing means located within the AAA server 30 or gateway device 12, where the source profile database and processor work in conjunction to compare received attributes to stored source profile information, as is well known in the art.

The source profile database may comprise programmable storage hardware or like means located on a conventional personal computer, mainframe computer, or another suitable storage device known in the art. Additionally, the means for comparing the received data to the data within the database can comprise any software, such as an executable software program, which can compare data. For example, the AAA server 30 may store source profiles on a hard drive of a personal computer, and the means for comparing the received source data to the source profiles resident on the computer can include computer software, such as Microsoft Excel (Microsoft Excel is a trademark of Microsoft Corporation, Redmond, Wash.). According to another embodiment of the invention, the AAA server 30 or source profile database can comprise a Remote Authentication Dial-In User Service (RADIUS) or a Lightweight Directory Access Protocol (LDAP) database, which are well known to those of skill in the art.

If a source fails to correspond to a source profile in the AAA server 30 at the time of authentication, the source will not be permitted access to the network. When this occurs, a user or user associated with a non-user source may be requested to input source profile information to the AAA server 30 so that the AAA server 30 can add the source's profile to the AAA server 30, and more specifically, to the source profile database. For example, this may occur the first time a user attempts to access the gateway device 12. According to another aspect of the invention, where the source cannot be identified, the source may be directed to a login page in order to gather additional information to identify the source. For instance, the information may be entered with the aid of a webpage, a pop-up control panel or user interface, which can open when the source initially connects to the gateway device 12, as effectuated by a home page redirection capability, described herein and in U.S. patent application, Ser. No. 09/458,569, filed Dec. 8, 1999, entitled "Systems And Methods For Redirecting Users Having Transparent Computer Access To A Network Using A Gateway Device Having Redirection Capability" (referred to hereinafter as the "Redirection Application"), in U.S. patent application, Ser. No. 09/458,579, filed Dec. 8, 1999, entitled "Systems And Methods For Redirecting Users Having Transparent Computer Access To A Network Using A Gateway Device Having Redirection Capability," and in U.S. patent application, Entitled "Systems and Methods for Redirecting Users Attempting to Access a Network Site," filed concurrently herewith, inventors Joel Short and Florence Pagan, the contents of each of which are incorporated herein by reference.

According to one aspect of the invention, the AAA server 30 can identify the source in communication with the gateway device in a manner that is transparent to computer users. That is, according to one aspect of the invention, a user will not be required to input identification information, reconfigure the source computer or otherwise change the source computer's primary network settings. Furthermore, no additional configuration software will have to be added to the source computer. After a packet is received by the gateway device, attributes identified by the data packet can be compared with the data contained in the source profile database. Therefore, in addition to not requiring the reconfiguration of computers accessing the network, AAA servers of the present invention have the ability to authenticate sources without requiring interactive steps by the computer user, such as the entering of a user ID. For instance, the AAA server 30 may automatically identify the source based upon a MAC address, so that authorization of the source can be readily determined. Therefore, it will be appreciated that the AAA server 30 can determine the user, computer, or location from which access is requested by comparing the attributes associated with the received data packet (such as in a header of the data packet) with data drawn from the source profile database. As will be described below, the access rights associated with the source may also be stored within the source profile database so that the system and method of the present invention can dynamically authorize access to particular services or destinations.

Once the source has established the network service connection via the authentication process discussed above, and a tunnel has been opened to facilitate a communication line between the source computer and a network, the gateway device 12 communicates with the AAA server 30 to assemble source profile information, or source-specific data. The source profile information that the gateway device assembles may include a MAC address, name or ID, circuit ID, billing scheme related data, service level data, user profile data, remote-site related data, and like data related to the source. As such, the AAA server 30 can transmit to the gateway device 12 any requisite information relating to the source's authorization rights and use of the network, as is next explained in detail.

In addition to authenticating users, the AAA server 30 of the present invention provides an authorization function, in which the source access rights are determined. The present invention enables dynamic authorization of sources, such that each source might have different respective network usage or access rights. After authentication, the AAA server 30 compares the attributes of the source with the access rights of the source associated with the user, computer, location or attribute(s). The access rights may be stored within the source profile database or within a separate subscription database located internal or external to the gateway device 12. Therefore, separate databases may be utilized, where one stores identification information on sources for authentication, and another database stores the access rights of those sources that have been authenticated. However, because the profiles of all sources, identified by attribute or a combination of attributes, are stored in a source profile database, it may be advantageous to locate information regarding access rights in the source profile database, which already contains information regarding each authenticated source, as described above.

According to one aspect of the invention the source profile database stores information defining the access rights of a source. For example, a source profile database may contain information indicating that a source having a particular MAC address has purchased pre-paid access, or that a given circuit ID has free access or unlimited access. Guests in a particular room or rooms of a hotel, for example, suites and penthouses, may receive free unlimited Internet access. Therefore, access rights can be available contingent upon the source's location (e.g. room) or location status (e.g. suite). In this event, no further identification is required, as the location from which the source is requesting access is known to the gateway device and stored in the source profile database.

In addition to storing information concerning what each source is authorized to access, the source profile database can also include specialized access information associated with a particular source, such as the bandwidth of the source's access, or a homepage to which the source should be directed. For example, a user accessing the network from a penthouse may receive a higher access baud rate than someone accessing the network from a typical hotel room. For example, where a user is transparently accessing the gateway device from a hotel room, the hotel network administrator may enter user access information into the source profile database based upon access rights associated with a room in the hotel. This can also be done automatically by the gateway device or a local management system, such as a hotel property management system, when the user checks into his or her room. Additionally, the user may establish the information to be contained within the source profile database upon first accessing the gateway device. For instance, a new user may be directed to enter a credit card number, e-wallet account information, pre-paid calling card number or like billing information to obtain access to the system. A source profile can also include historical data relating to a source's access to the network, including the amount of time a source has accessed the network. Specialized access or accounting information contained within the source profile database may be established by the system administrator, or by the source who has purchased or otherwise established access to the network.

According to one aspect of the invention, the authorization capability of the AAA server 30 can be based upon the type of services the source is attempting to access, such as a destination address, identified by the gateway device 12 based upon data received from the source computer. The destination can be a destination port, Internet address, TCP port, network, or the like. Moreover, the authorization capability of the AAA server 30 can be based upon the content type or protocol being transmitted. According to the system and method of the present invention, each packet can be filtered through the selective AAA process, so that any or all sources can be authorized access to a particular destination based on the access rights associated with the respective sources. Therefore, according to the present invention, each time the source attempts to access a different destination, the source is subject to the AAA, so the source may be prevented access from a particular site the AAA server 30 deems inaccessible to the source based upon the source's authorization. Alternatively, the AAA method according to the present invention allows some or all sources to connect directly to a specific site, such as credit card or billing servers for collecting billing information, which can collect payment or billing information so that the source profile can be updated and the source thereafter authorized access to networks. According to the system and method of the present invention, a source's authorization can also depend upon objective criteria, such as a specific time, so that the session can be terminated at a specific time, after a specific time has elapsed, or according to other dynamic information determined by the network provider. Furthermore, authorization can be associated with a combination of attributes. For example, a user may be authorized access to a network where the user has input the user's identification and has accessed the network from a particular room. Such a requirement could prevent unauthorized users also staying in a particular room from obtaining network access. Therefore, AAA can be based upon the origination, destination, and type of traffic.

Figure 2:
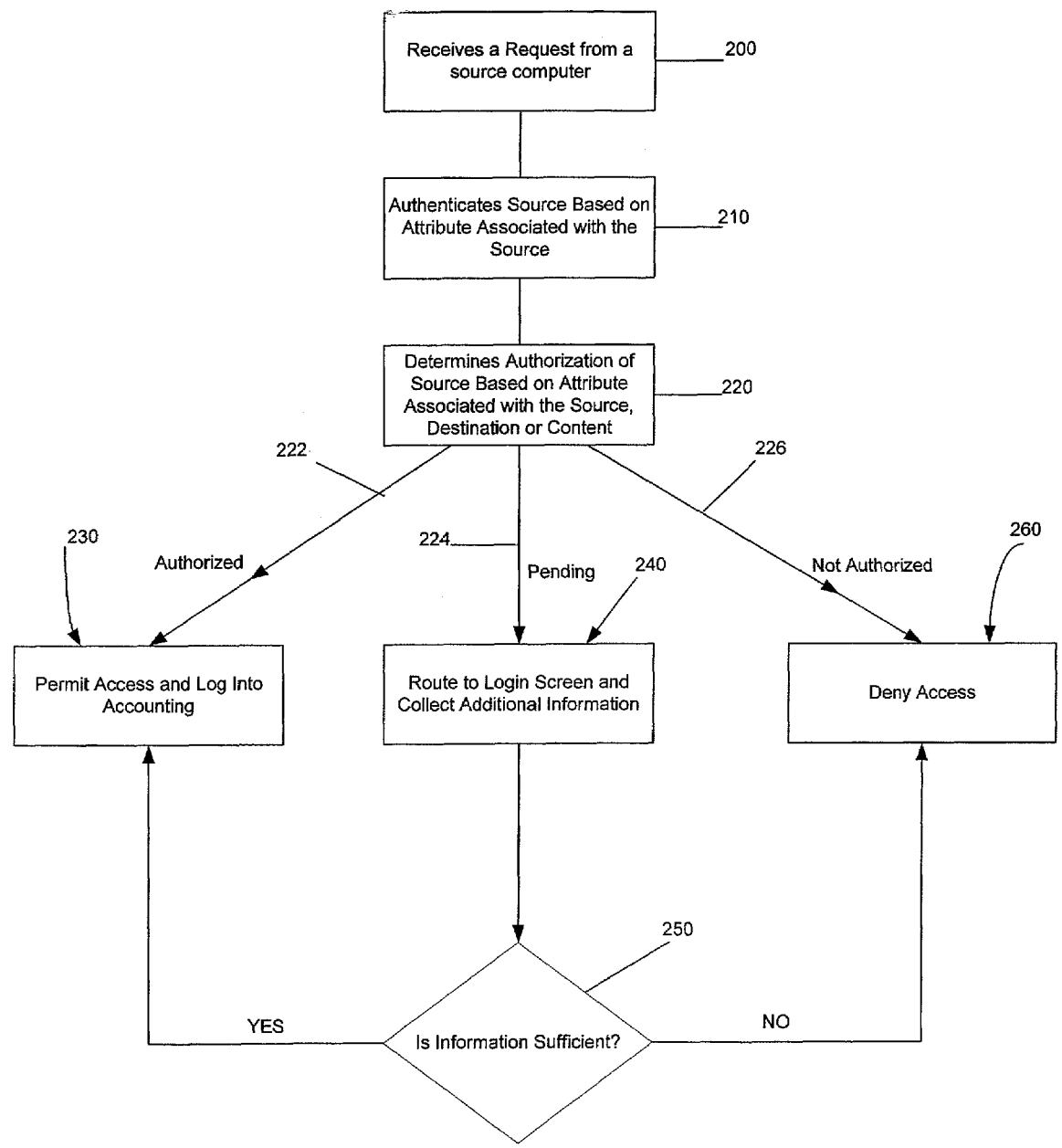
FIG. 2 is a flow chart of a method in which a AAA server performs authentication, authorization, and accounting, according to one aspect of the invention.

By way of further explanation, a flow chart of the operation of the AAA server 30 will be described with respect to FIG. 2, according to one aspect of the invention. In operation, a source computer requests (block 200) access to a network, destination, service, or the like. Upon receiving a packet transmitted to the AAA server 30, the AAA server 30 examines the packet to determine the identity of the source (block 210). The attributes transmitted via the packet are temporarily stored in the source profile database so that the data can be examined for use in determining authorization rights of the source. The attributes contained in the packet can include network information, source IP address, source port, link layer information, source MAC address, VLAN tag, circuit ID, destination IP address, destination port, protocol type, packet type, and the like. After this information is identified and stored, access requested from a source is matched against the authorization of that source (block 230).

Once a source profile has been determined by accessing the authorization rights stored in the source profile database, three possible actions can result. Specifically, once a source's authorization rights have been retrieved the AAA server 30 may determine a source to have access 222, to be pending or in progress 224, or to not have access 226. First, a source is deemed valid (i.e., to have access) where the source profile database so states. If a source is determined to be valid, the source's traffic can be allowed to proceed out of the gateway device to the networks or online services the user associated with the source wishes to access (block 230). Alternatively, the source may be redirected to a portal page, as described in the Redirecting Application, prior to being allowed access to the requested network. For example, a user may be automatically forwarded to a user-input destination address, such as an Internet address, for example, where a user has free access associated with the user's hotel room. Alternatively, this may occur where the user has already purchased access and the user has not exhausted available access time. Furthermore, an accounting message may be initiated 230 to log the amount of time the user is utilizing the gateway device such that the user or location may be billed for access.

If the second scenario occurs, in which the source is deemed pending 224 or in progress, the source may take steps to become authenticated (block 240) so that the source information is recorded in the source profile database. For example, a user may have to enter into a purchase agreement, requiring the user to enter a credit card number. If the user needs to purchase access, or if the system needs additional information about the user, the user can be redirected from the portal page via Home Page Redirect (HPR) and Stack Address Translation (SAT) to a location, such as a login page, established to validate new users. SAT and HPR can intervene to direct the user to a webserver (external or internal) where the user has to login and identify themselves. This process is described in detail in the Redirecting Application. After inputting any necessary and sufficient information, the user is then be permitted access to a destination address (block 230, 250). Where the information provided is insufficient the user will not be authorized access (block 260). Finally, a third scenario can occur in which a source is deemed not to have access 226 so that the user is not permitted to access a destination via the network (block 260).

Referring now to the accounting function of systems and methods of the present invention, upon authorizing a source network access, the AAA server 30 can register an accounting start to identify that the source is accessing the network. Similarly, when the source logs off or terminated the network session, an accounting stop can be registered by the AAA server 30. Accounting starts or stops can be identified by the gateway device 12 or by the AAA server 30 upon a source's authentication or authorization to access a desired destination. Furthermore, accounting starts or stops can be registered in the source profile, or can be stored in a database separate from the AAA server 30 and located external to the network. Typically, accounting starts and stops include time stamps that indicate the amount of time a source has been accessing the network. Using this data, the time between the accounting start and accounting stop can be tallied so that the source's total connection time may be computed. Such information is valuable where the source is charged by an increment of time, such as an hour. A billing package, as are well known in the art, could then tally a user's total time accessing the network over a set period, such as each month, so that a bill can be created for the source. Because networks and ISPs often may charge a set rate for a specific duration of time (i.e., flat rate pricing), such as a month, regardless how much time is being spent accessing the network, accounting stops and starts may not be required for billing purposes. Nevertheless, accounting starts and stops may generally be recorded by the network provider or ISP for usage statistics.

An ISP or similar access provider would additionally benefit from being able to track subscriber's use of the ISP to establish bills, historical reports, and other relevant information. Preferably, the AAA server 30 is in communication with one or more processors for determining any fees which may be charged to the source, or due from the source, for network access or services. The AAA server 30 retrieves the historical accounting data in a real time basis or after a specific interval of time has elapsed. Preferably, the AAA server 30 retains such data in an easily accessible and manipulatable format such that the access provider (e.g., ISP) can produce reports representative of any desired type of historical data. For example, to project future use of the access provider, the AAA server 30 produces reports tallying the number of users accessing the Internet at certain time periods and from specific locales. Moreover, where the access provider provides alternative access to users, such as charging for faster connections (i.e., higher baud rate) for additional fees, the access provider may wish to analyze historical data using the AAA server 30 to best meet future customer demands. Such data may relate to network sessions currently on-going, the duration of those sessions, the bandwidth currently being used, the number of bytes that have been transferred and any other pertinent information. The AAA server 30 may be implemented using well known programs, such as Eclipse Internet Billing System, Kenan Broadband Internet Billing Software (manufactured by Lucent Technologies), or TRU RADIUS Accountant.

It will be appreciated that the AAA server 30 can dynamically account source access to a network in the same manner in which access is customizable on a source by source basis. That is, the AAA server 30 can maintain accounting records that vary depending upon the identity of a source, source location, source requested destination, or the like. Like the access or authorization rights, this information can be maintained in the source profile database or a similar accounting database. For instance, the AAA server 30 may determine that a particular source is only charged for accessing particular sites, and will only register an accounting site when those particular sites are accessed. Therefore, the AAA server 30 will identify account information stored in the subscriber's source profile to determine accounting starts, accounting stops, billing rates, and the like.

Referring again to FIG. 1 in describing another embodiment of the invention, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher, position in the system by being located closer to the various networks 20 or other online services 22, if so desired. For example, the gateway device 12 could be located at a network operating center or could be located before or after a router 18 in the computer network. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of other networks or other online service providers, such as Internet service providers, based upon the user's selection. It will be appreciated by one of ordinary skill in the art that one or more devices illustrated in FIG. 1 may be combinable. For example, although not shown, the router 18 may be located entirely within the gateway device 12.

The gateway device 12 of the present invention is specifically designed to adapt to the configuration of each of the computers 14 that log onto the computer system 10 in a manner that is transparent to the user and the computer networks 20 or online services 22. In the embodiment shown in FIG. 1, the computer system 10 employs dynamic host configuration protocol (DHCP) service, which is a protocol well known to those of skill in the art and currently implemented in many computer networks. In DHCP networks an EP address is assigned to an individual computer of the plurality of computers 14 when the computer logs onto the computer network through communication with the gateway device 12. The DHCP service can be provided by an external DHCP server 24 or it can be provided by an internal DHCP server located within the gateway device.

In order to allow a user of the computer to communicate transparently with computer networks 20 or online services 22, the gateway device must be able to communicate with the user computer, as well as the various online services 22 or networks 20. In order to support this communication, the gateway device 12 generally performs a packet translation function that is transparent to both the user and the network. In this regard, for outbound traffic from a computer to a network or on-line service, the gateway device 12 changes attributes within the packet coming from the user, such as the source address, checksum, and application specific parameters, to meet the criteria of the network to which the user has accessed. In addition, the outgoing packet includes an attribute that will direct all incoming packets from the accessed network to be routed through the gateway device. In contrast, the inbound traffic from the computer network or other online service that is routed through the gateway device undergoes a translation function at the gateway device so that the packets are properly formatted for the user's host computer. In this manner, the packet translation process that takes place at the gateway device 12 is transparent to the host, which appears to send and receive data directly from the accessed computer network. By implementing the gateway device as an interface between the user and the computer network or other online service, however, the user will eliminate the need to re-configure their computer 12 upon accessing subsequent networks as well as the need to load special configuration software on their computer to support the reconfiguration.

Figure 3:
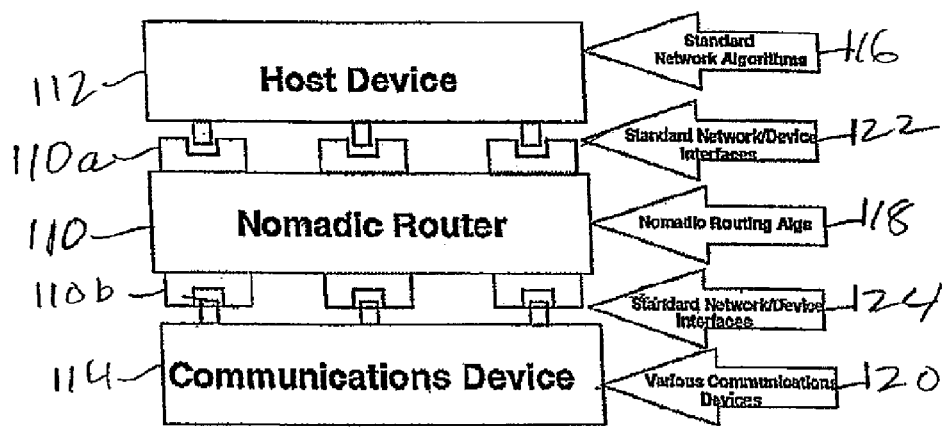
FIG. 3 is a diagram illustrating the implementation of the present nomadic router between the host computing device and various communication devices through standard interfaces.

FIG. 3 illustrates a "Nomadic" translator or router 110 embodying the present invention as being connected between a host device or computer 112 and a communications device 114. The host device 112 is a laptop computer or other fixed or mobile digital data communication terminal which is sufficiently portable or mobile that it can be carried from one location or another. A laptop computer, for example, can be used in any convenient location such as an airplane, customer's office, home, etc.

The communications device 114 can be part of any type of communication system to which the host computer 112 can be connected. Such communication systems include, but are not limited to, local networks, wide area networks, dial-up and direct internet connections, etc. In a typical application the communications device will connect the host computer to a local network which itself is connected to the internet. Thus, the host device 112 is able to communicate with an unlimited number of networks and nodes which are themselves interconnected with routers, switches, bridges, etc. in any known manner.

The present router 110 includes a terminal interface 110*a* which normally is used to connect the router 110 to the host device 112, and a system interface 110*b* which connects the router 110 to the communications device 114. As will be further described below, the router 110 generally includes a processor consisting of hardware and/or software which implements the required functionality. The router 110 is further configured to operate in an alternate mode in which the host device 112 is connected directly to a network, and the router 110 is also connected to a point in the network via the system interface 110*b*. In this case, the terminal interface 11*as* is unused.

Although the device 110 is described herein as being a router, it will be understood that the router 110 is not a conventional router in that it includes the capability for providing interconnectability between networks. Instead, the present router 110 is essentially a translator which enables the host device 112 to be automatically and transparently connected to any communications device 114, and process incoming and outgoing data for the device 122.

The host device 112 is provided with a permanent internet address which is conveniently not changed in accordance with the present invention. The device 122 is also initially configured to communicate with a particular gateway or other home device at its base location. The gateway has a home address which the device 122 attempts to locate when it is connected to any communication system. Without the functionality of the present nomadic router 110, the host device 122 would not be able to operate at a remote location because it would not find its gateway.

It will be understood that the term "home" does not relate to a residence, but is the network, gateway or other communication device or system to which the terminal is normally connected and which corresponds to the home internet or IP address.

FIG. 3 further illustrates a top protocol layer 116 representing the host computing device 112 which generates and consumes data that is transferred through the communications device 114. This interface 116 is done just below the IP layer, and above the link layer in the typical OSI/ISO model. In the middle is a layer 118 which represents the router 110 and whose function it is to adaptively configure and utilize the underlying communications device and provide the router support described herein. A lower layer 120 is a physical conunumication which carries out the communication (potentially wire-lined Internet based, ad-hoc or wireless) as made available and determined for use by the nomadic router or user. Between the router layer 118 and the layers 116 and 120 are interfaces 122 and 124 which the router 110 identifies and configures dynamically.

Figure 9A:
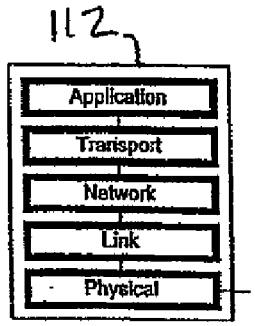
FIGS. 9a to 9g are diagrams illustrating protocol stack implementations for various network devices, and the translation function happening at all layers of the protocol stack in the nomadic router.

The present router operates with host computers, routers, and other network devices through well-defined standard interfaces such as specified by the IETF (Internet Engineering Task Force) and IEEE standardization committees. These standards specify the packet format, content, and physical communication characteristics. As shown in FIG. 9*a*, host computers have to be configured at various layers of the protocol stack depending on the communication capabilities and configuration of the current network being attached to.

Figure 9B:
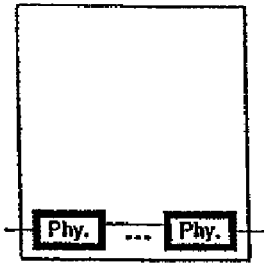

Hubs, as shown in FIG. 9*b*, provide a well-defined interface to connect host computers and network devices by transmitting packets across multiple physical connections. Hubs do not provide any manipulate or translation of the content of the packets being transmitted.

Figure 9C:
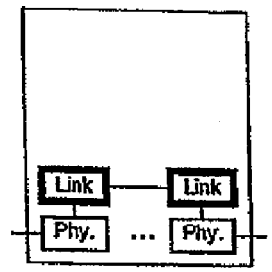

Bridges or switches, as shown in FIG. 9*c*, provide an intelligent filtering mechanism by which they only transmit packets across multiple physical connection based upon which physical connection the device is connected to, according to the link layer addressing (Media Access Control Address). Bridges and switches do not manipulate the content of the packet and do not provide any higher layer protocol functionality.

Figure 9D:
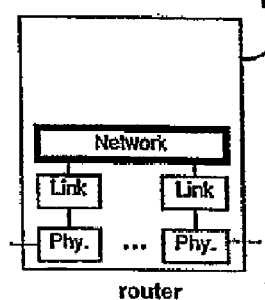

Routers, as shown in FIG. 9*d*, accept packets based upon the destination address at the network layer in the packet. The host computer must explicitly address the packet at the link layer to the router. The router will then retransmit the packet across the correct physical connection based upon how it is configured. No modification or translation of the packet is performed at any layer of the protocol stack other than the network layer.

Figure 9E:
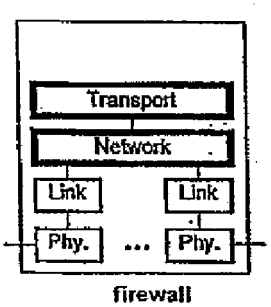

Firewalls, as shown in FIG. 9e, filter packets at the network and transport layers to only allow certain packets to be retransmitted on to the other physical connection. Firewalls do not manipulate the content of the packet, only forward it on to the next hop in the network if it passes the transport (port) or network (IP address) filter.

Figure 9F:
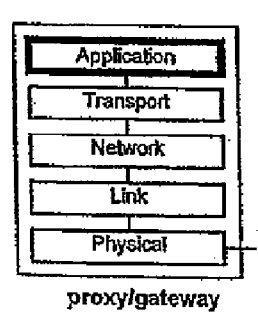
Figure 9G:
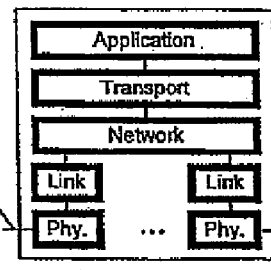

Proxys and gateways, as show in FIG. 9f, only receive packets explicitly addressed to them by host computers. They only manipulate packets at the application level. The present nomadic outer 110, as shown in FIG. 9g, manipulates the content of the jackets at the link, network, transport, and application layers of the protocol stack to provide a translation between how the host computer is configured and the configuration of the network the host computer is currently attached to.

Unlike all other devices shown in FIGS. 7a to 7f, the router 110 will automatically intercept and translate packets without the other devices being aware of the router 110 or have to be configured to use it. The translation algorithms in the router 110 which provide this location independence are provided completely internal to the router 110. Thus no new standards need to be developed, accepted, or implemented in host computers 112 or routers 126 to deploy new network services when using the nomadic router.

Whenever a new or different communication device (which includes the link and physical layers) is utilized in a host computer 112, the host computer's network layer must be aware of this new communication device. Since the router 110 has it's own network interface to the communication device, alternate communication devices can be utilized in the router 110 which the host computer 112 can utilize but does not have to be configured to use.

Permanent Addressing not Location Based

Today we communicate with individuals in terms of the location of their communications instruments (for instance, their computer's IP address or their fax machine's phone number). In order to support mobility and changing communication environments and devices, it is necessary to create an environment where people communicate with other people, and not specifically with the devices they use. To transparently support mobility and adaptivity in a wireless, potentially ad-hoc, communication internetwork, a common virtual network must be provided by an intelligent device or agent which supports the various computing hosts and communication devices.

Figure 4:
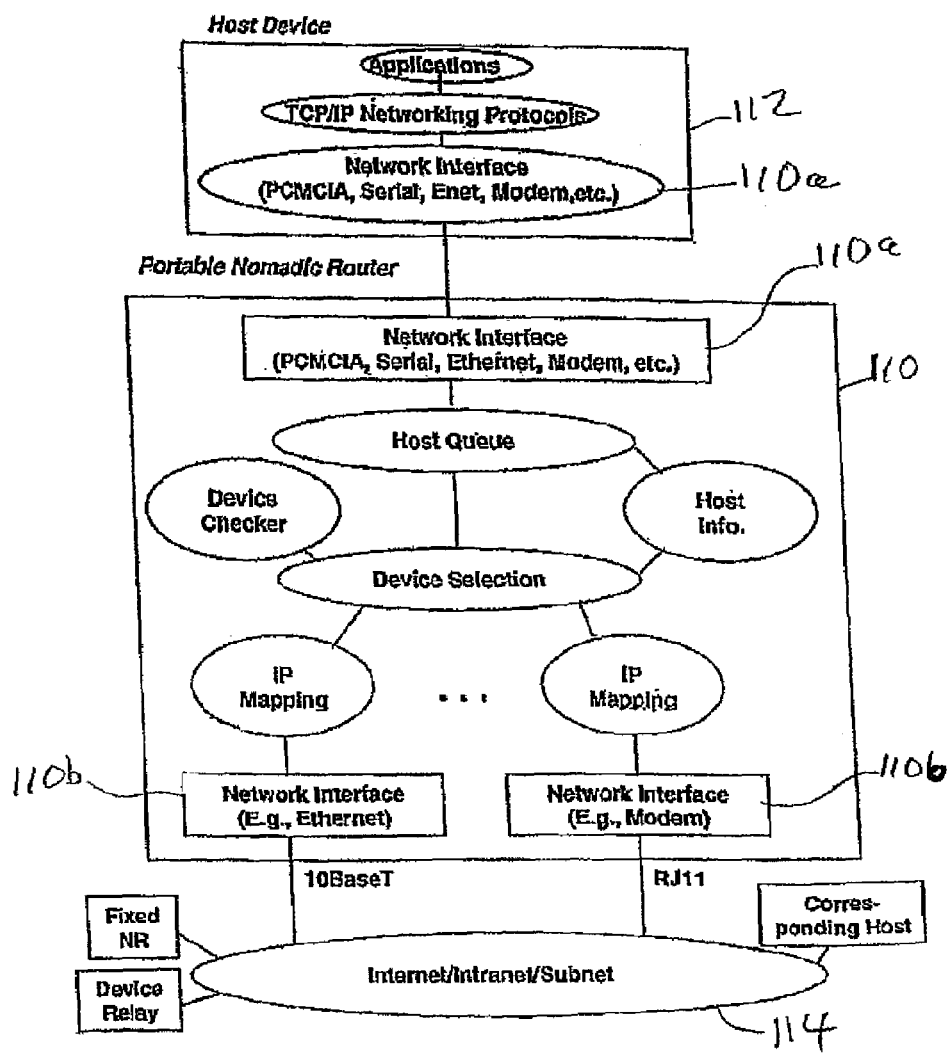
FIG. 4 is a diagram illustrating the basic nomadic router architecture, which is referred to as the hardware implementation architecture.

The present nomadic router 110 provides the mapping between the location based IP address used in the Internet today and the permanent user based address housed in the host CPU in the device 112. This is illustrated in FIG. 4 as "IP Mapping". This mapping is done without support or knowledge of such mapping by the host CPU or user.

Figure 5:
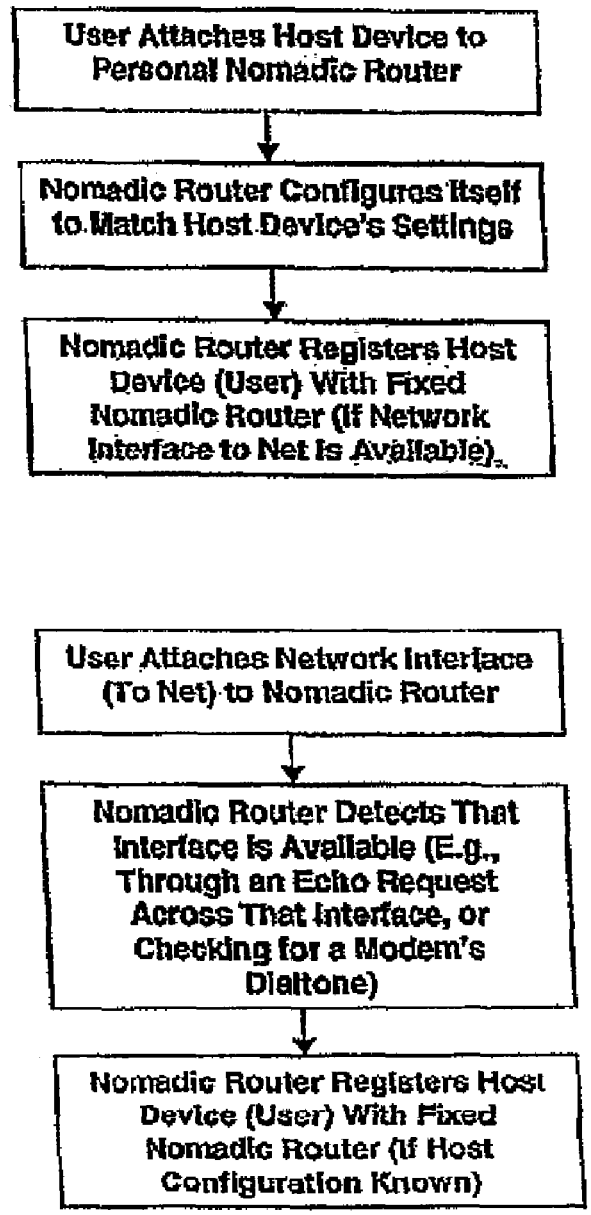
FIG. 5 is a flowchart illustrating a configuration overview of the basic steps performed when a host device is attached to the present nomadic router and when a network interface is attached to the router.
Figure 6:
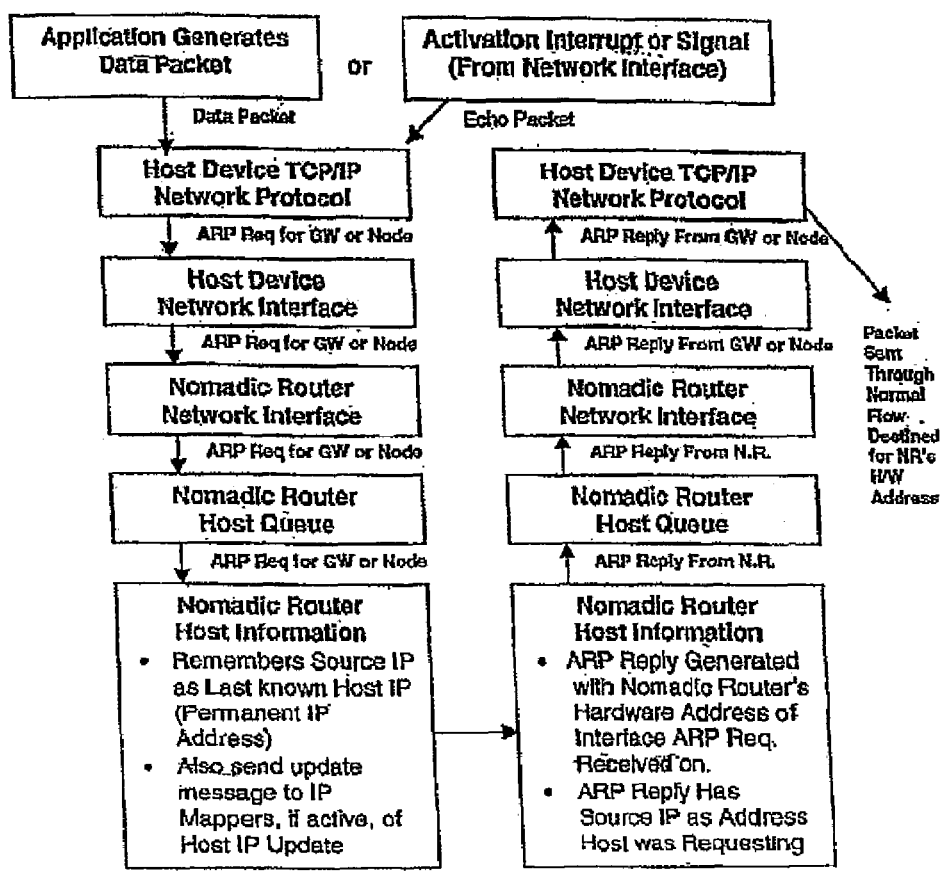
FIG. 6 is a flowchart illustrating the router's automatic adaptation to the host device when the first data packet from the host is sent to the attached router or when an activation interrupt or signal is received.

The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router. The host configuration information such as its IP number are discovered or determined as illustrated—in FIG. 6 and stored in the nomadic router 110 as illustrated in FIG. 4 as "Host Info." This configuration process is overviewed in FIG. 5.

Optional Off-loaded Processing

As illustrated in FIG. 4, the nomadic router 110 can provide off-load communication processing for the host CPU by being physically separate from the host device 112. The adaptation, selection, and transportation of information across the network is performed by the nomadic router 110. This allows the host terminal or device 112 to utilize the network without having to directly support the network protocols. By having the nomadic router be responsible for adapting to the current network substrate, the host CPU can maintain a higher performance by not having to run the routing, adaptation, packetization, etc. algorithms or packet processing.

The nomadic router can also queue, transmit, and receive data independent of whether or not the host device 112 is available or even attached. The CPU 11 built into the nomadic router 110 provides all necessary computing routines to be a fully functional network co-processor independent of the host CPU. This will allow increased battery for the user since the nomadic router does not have numerous user I/O devices as does the host device 112.

Location Independence

The instant network nomadic router provides the ability to provide ubiquitous and reliable support in a location independent fashion. This removes any burden on the user for device reconfiguration (e.g., IP address configuration, gateway or next hop router address, netmask, link level parameters, and security permissions) or data transmission.

The problem with existing protocol stacks is that communicating devices have to be reconfigured every time the communication environment changes. TCP/IP requires a new network, node and gateway number. Appletalk will automatically choose an unused node number and discover the network number, but all open communications are lost and services have to be restarted to begin using the new information.

This occurs, for example, when a PowerBook is plugged into a network, put to sleep, and then powered up in a different network. All network services, are restarted upon wakeup, and network applications get confused if they, are not restarted. The nomadic router solves this problem by providing temporary as well as permanent network and node numbers similar, to that provided by Mobile IP. However, the nomadic router will also work with other protocol stacks (e.g., AppleTalk).

Figure 7:
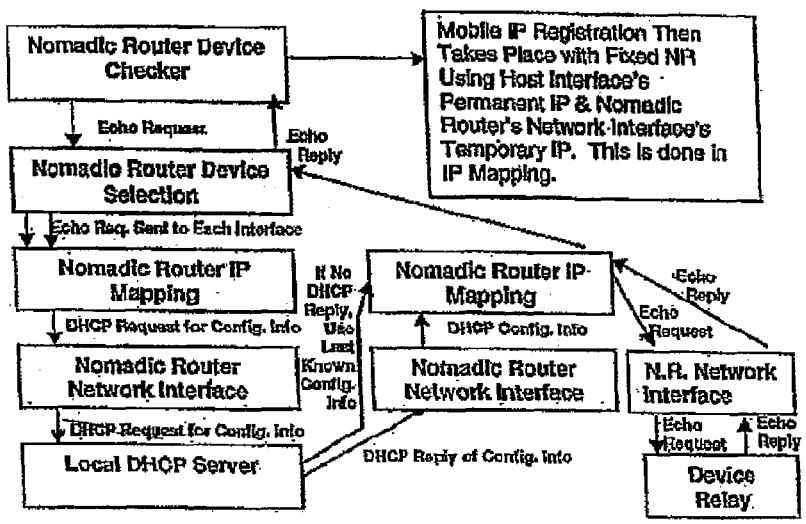
FIG. 7 is a flowchart illustrating the process by which the router initializes and checks the various communication device interfaces for initialization, activation, etc.

Mobile IP provides location independence at the network level and not at the link level. All link level parameters, which are device specific, will be automatically configured as illustrated in FIG. 7 when a new communications (network interface) device is attached to the nomadic router. The nomadic router completely eliminates the need for manual configuration by adaptively supporting device independence.

A problem with existing routers today is that they require manual configuration and exist external to the node. To overcome this, the nomadic router can support automatic configuration and full router functionality internally. This allows a mobile or nomadic node to adapt to various communication and network devices dynamically, such as when the user plugs in a PCMCIA card or attaches a communications device to the serial port.

Once the nomadic router becomes aware of the available communication devices and activates them, the transport of data across the multiple communication substrates can take place. The unique algorithm and protocol in the nomadic router which chooses the most appropriate device to use, is shown in FIG. 4 and FIG. 7 as part of the nomadic router Device Checker through the "nomadic router Device Selection" across each interface.

There are numerous factors that can affect the selection of utilizing one or more devices. Such factors typically include available bandwidth, cost to initiate and maintain connection, power requirements and availability, and user's preference.

Figure 8:
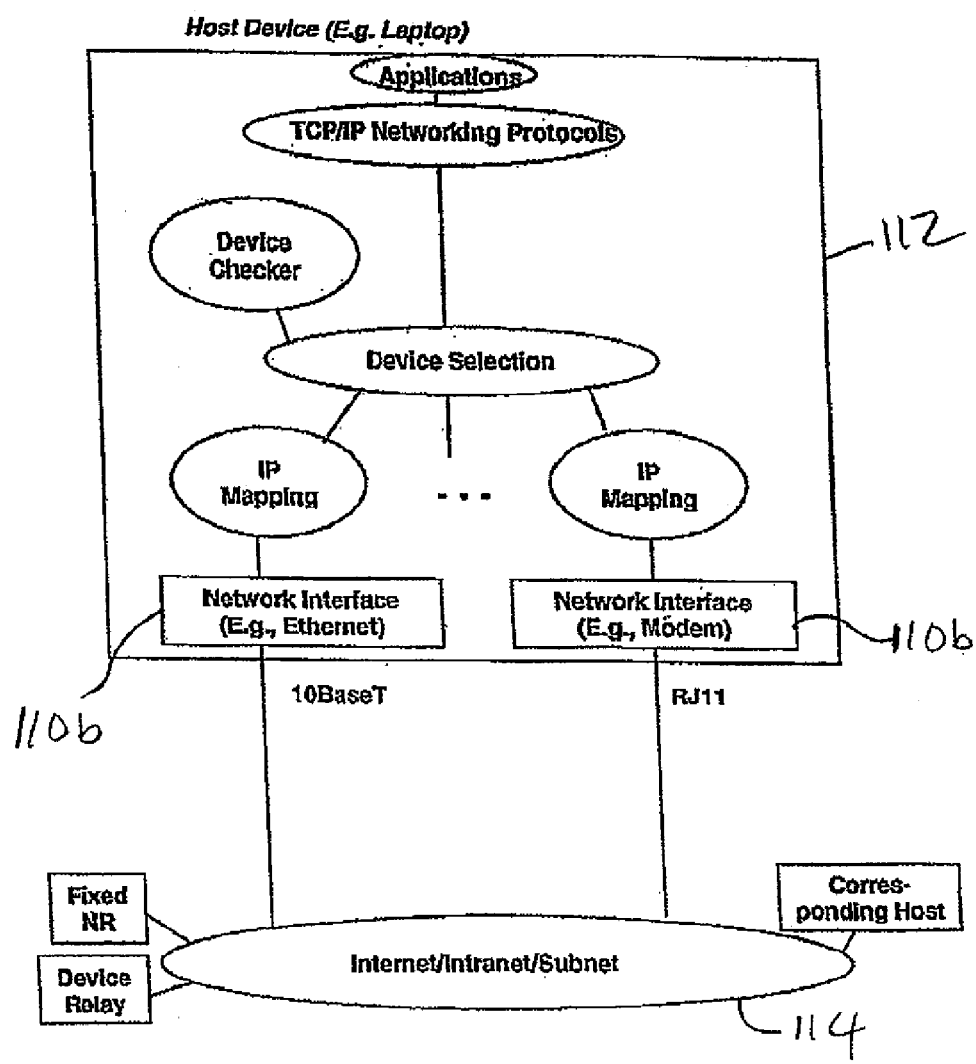
FIG. 8 is a diagram illustrating the basic nomadic router architecture when implemented as software in the host device.

Another feature of the nomadic router is the support for alternate or simultaneous use of various communication substrates. This is performed as part of step 5 in FIG. 8 when the source address is that of the communication substrate that the nomadic router is going to send the packet out on. Host computers will now indirectly be able to utilize two or more communication substrates, either to increase throughput or to provide soft-, handoff capability.

This functionality is not supported in today's typical protocol stacks (e.g., TCP/IP or AppleTalk). Once the nomadic router becomes aware of the available communication devices and activates them, the transport of data across the multiple communication substrates can take place. The unique algorithm and protocol in the nomadic router which chooses the most appropriate device to use is part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Apparatus Packaging As described above, the nomadic router can be packaged in several different hardware configurations. The nomadic router can be embedded in the host computer, or network device such as a switch or router. It can also be implemented as a PCMCIA card which plugs into the host computer or as self-contained external box.

Figure 12A:
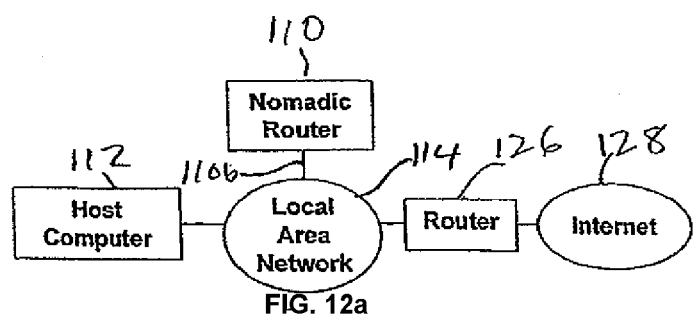
FIGS. 12a to 12d are diagrams illustrating host and network interface modes in which the nomadic router is able to operate.

Each nomadic router can have from one to many interfaces. If the router 110 is put into the network infrastructure, it doesn't have to be carried around with the mobile user. As shown in FIG. 12a, the nomadic router 110 is attached to a Local Area Network (LAN) of the network infrastructure which constitutes the communications device 114 through the system interface 110b. The LAN 114 is connected through a conventional router 126 to the internet 128. In this case, the host computer interface 110a of the nomadic router 110 is not needed since packets from the host computer 112 are received through the LAN 114.

Figure 12B:
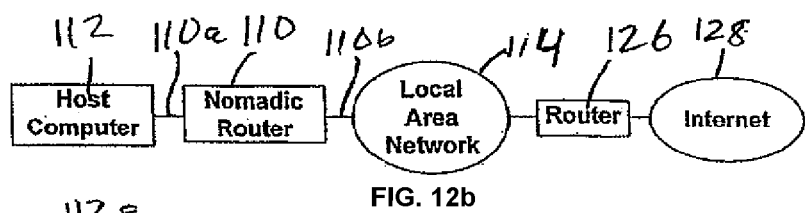

To provide a secure interface between the host computer 112 and network 114 to prevent host computers from being able to watch (sniff) packets on the network 114, the nomadic router 110 can have one interface to the host computer 112 (terminal interface 110a) and a second interface (110b) to the network 114 as shown in FIG. 12b, and provide filtering to which packets and retransmitted between the various interfaces thus providing a firewall type of security device but which operates internally on the network.

Figure 12C:
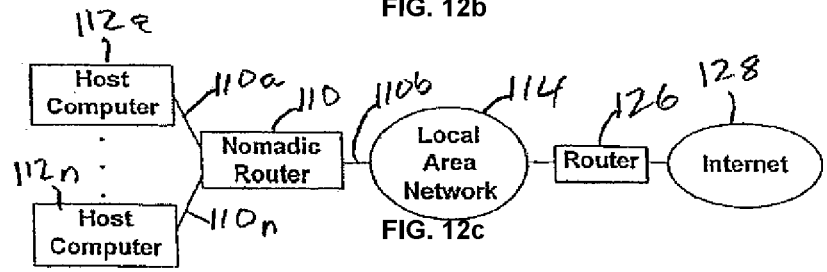
Figure 13:
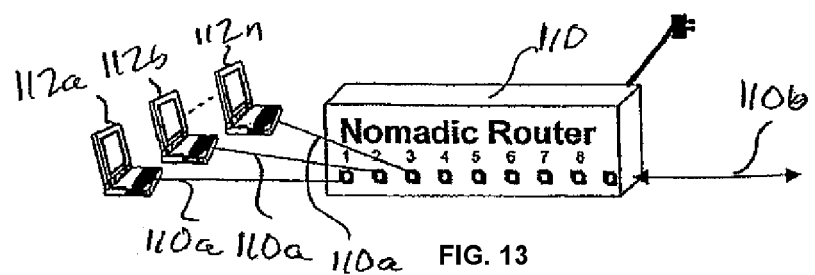
FIG. 13 is a simplified perspective view illustrating the nomadic router as implemented in a self-contained box which connects onto a local area network via a network interface port and has multiple ports to connect to host computers.

In order to support multiple host computers 112a ..., 112n with a single nomadic router 110, the nomadic router 110 may have multiple host interfaces $110a_1, \ldots 110a_n$ as shown in FIG. 12c and in FIG. 13 and a network or system interface 110b.

Figure 12D:
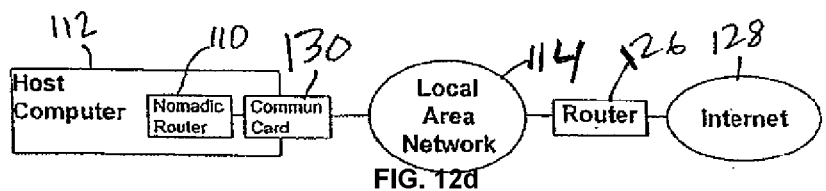

If the nomadic router is carried around by the mobile user, it can take the form of a PCMCIA card. In FIG. 12d, the nomadic router 110 is implemented as a PCMCIA card. The processing and translation capability is stored inside the card and the interface to the host computer 112 is through a PCMCIA BUS interface or communication card 130.

Figure 14:
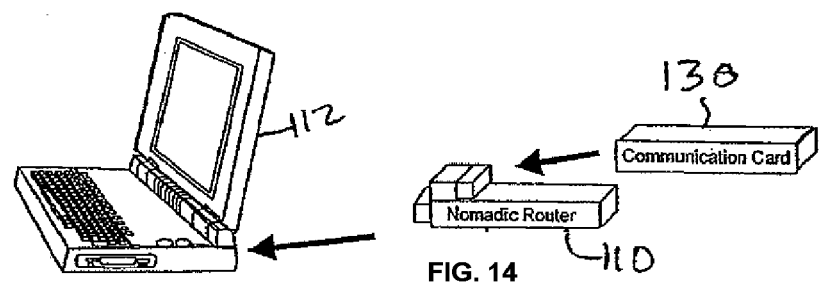
FIG. 14 is a simplified perspective view illustrating the nomadic router apparatus as implemented on a PCMCIA Type III card where the nomadic router plugs into the host computer's type II slot and the communication card device, of Type II, plugs directly into the nomadic router so both may be powered and stored in the portable host computer.

As shown in FIG. 14, the PCMCIA card can fit in a type III slot where there is a connector on the nomadic router 110 which accepts the communication card 130 (a type II PCM-CIA card.) In this mode, the nomadic router doesn't not have to have the communication device specific components inside the PCMCIA card.

Figure 15:
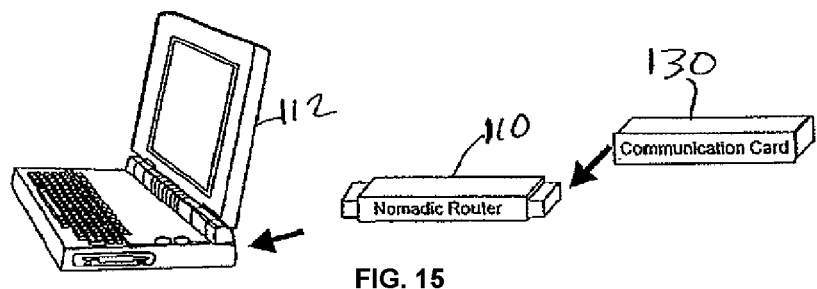
FIG. 15 is a simplified perspective view illustrating the nomadic router as implemented on a PCMCIA Type II card where the nomadic router plugs into the host computer via a type II interface slot and where the communication card device, Type II, plugs into the nomadic router type II card.

The nomadic router 110 can also take the form of a type II PCMCIA card. In this form, the communication device or card 130 plugs into the opposite end of the nomadic router card 110 as illustrated in FIG. 15.

TRANSLATION OPERATION OF THE NOMADIC ROUTER

Initialization and Self Configuration

The nomadic router initialization and self configuration process provides the means by which the nomadic router is able to learn about the host computer and network so it knows what translation is necessary.

Host Learning

The nomadic router 110 is able to learn about how the host computer 112 is configured, by looking at the content of the packets being sent from the host computer 112. Rather than the host computer 112 sending packets directly to the router 126 or other network device, which is what it is initially configured to do, the nomadic router 110 is able redirect all outbound packets from the host computer 112 to itself This redirection can be accomplished in several ways as described below.

1. Proxy ARP Packet Interception and Host Reconfiguration

Figure 10:
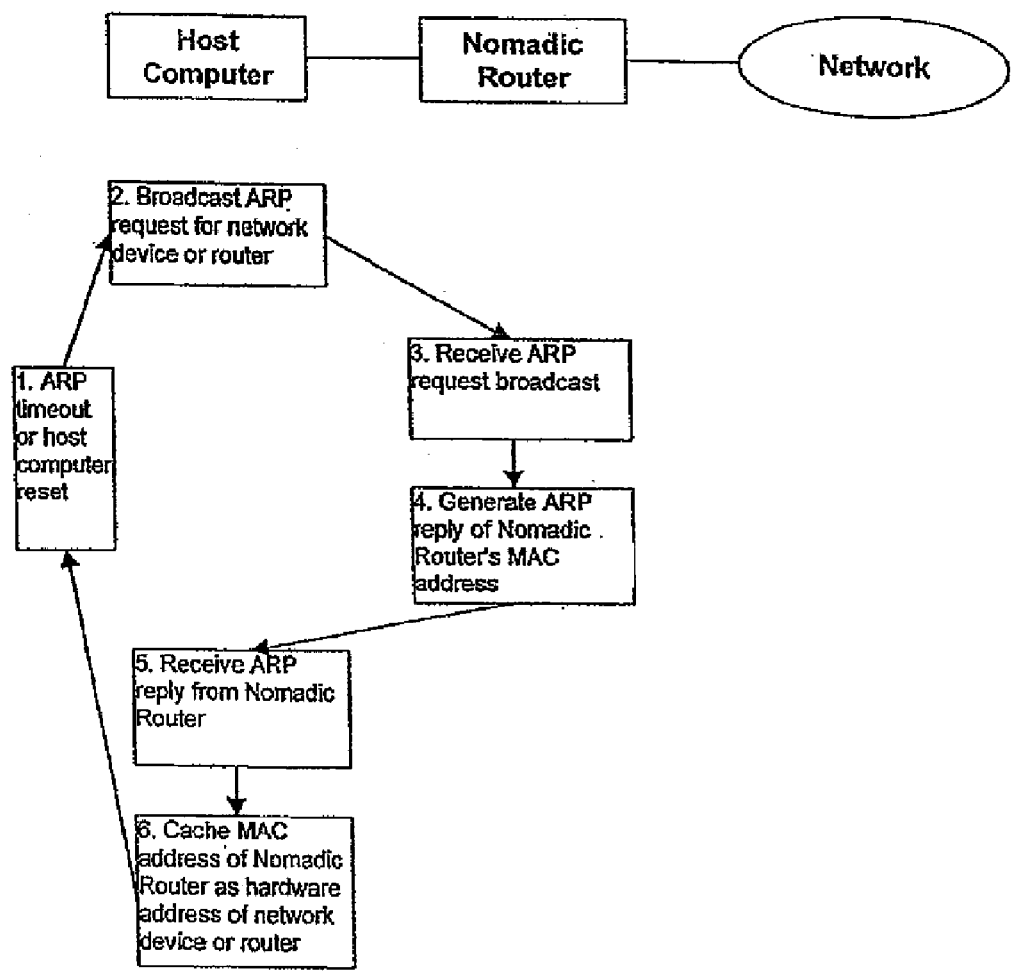
FIG. 10 is a flowchart illustrating the nomadic router's proxy ARP packet interception and host reconfiguration process.

Whenever a host computer 112 has an IP packet which it needs to send to a router 126 or other network device, it uses the Address Resolution Protocol (ARP) to obtain the link layer Media Access Control address (MAC address). As illustrated in FIG. 10, when the host computer 112 broadcasts and ARP request for the MAC address of a destination node, the nomadic router 110 receives this ARP request broadcast and responds with its MAC address (not that of the destination node).

When the host computer 112 receives this ARP reply from the nomadic router 110, which contains the MAC address of the nomadic router 110, the host computer 112 will cache this MAC address in the host computer 112 and send all packets destined for the configured router or network device to the nomadic router 110. The host computer 112 will think that the MAC address is that of the configured IP network device, but in reality, the nomadic router 110 is pretending (proxying) to be the device (its home gateway) that the host computer 112 expects to find.

The nomadic router 110 is also able to reconfigure and intercept return packets from a router or other network device using the same process.

2. Promiscuous Mode Packet Interception

Since the MAC address is cached in the host computer 112 for a short period of time, the host computer 112 will not send out a new ARP request to obtain the MAC address again unless a timeout period occurs or the cache is cleared such as when the computer 112 is restarted.

When a conventional network device receives or hears a packet with a MAC address which does not match its own, it will ignore or drop the packet. Since it is possible to rapidly switch from one network environment to another using a portable computer, the nomadic router 110 must be able to intercept packets even when the MAC address is not that of the nomadic router's home gateway or device.

This is accomplished by placing the nomadic router's network connection in promiscuous mode. In this mode, the network connection on the nomadic router accepts all packets being transmitted. on the communication link, not just ones being broadcasted or addressed specifically to it.

3. Dynamic Host Configuration Protocol (DHCP) Service

A host computer is able to utilize the DHCP service to obtain the configuration information rather than being manually configured. The host computer utilizing the DHCP service requires that a DHCP server be installed on the network segment to which it is currently attached. If the host computer 112 is utilizing this service and requests configuration information using DHCP, the nomadic router 110 will intercept these requests and respond with configuration information for the host computer 112 to use.

Network Learning

The nomadic router is able to learn about the network environment it is currently attached using several different methods as described below.

1. Dynamic Host Configuration Protocol (DHCP)

Whenever a different network connection is connected on the nomadic router, it will broadcast a DHCP request to obtain configuration information for the current network. If no DHCP service is available on the network, it will switch to another method to learn about the network configuration.

2. Router Information Packets

Routers on the network will periodically broadcast router information packets which are used to build routing tables and allow routers to adapt to changes in the network. The nomadic router 110 will listen on the network for these router information packets. When one is received, it will extract out the configuration information from these packets.

3. Passive Listening

By placing the nomadic router's network connection in promiscuous mode, where is receives all packets not just ones destined for it, it is able to examine all packets on the network to discover how the network is configured. It is also able to determine the IP addresses used on the local area network and which machines are routers by the final destination address not being the next hop address.

Using this method, the nomadic router 110 is passively able to learn how the network is configured and will elect to use an unused IP address. If that IP address does become used by another network device, it will switch over to another unused IP address.

4. Manual Configuration

The network configuration information can be manually configured in the nomadic router 110. This information' can be set using an embedded web server, Simple Network Management Protocol (SNMP) tools, an application running on one of the computers in the network, or other suitable means. When manual configuration is used to set the network information, the nomadic router 110 will still learn about the host information automatically and provide all the translation capabilities so the host computers do not have to be aware of the correct network information of the LAN to which they are currently connected.

Packet Translation

The nomadic router's packet translation function provides a mapping between location and service dependent configurations used by the host computer 112 and that used by the network 114 to which it is currently attached. For outbound traffic from the host; computer 112 to the network 114, the translation function changes the content of the packet such as the source address, checksum, and application specific parameters, causing all packets sent out to the network 114 be directed back to the nomadic router 110 rather than to the host computer 112.

The inbound traffic from the network 114 arriving at the nomadic router 110, which is really for the host computer 112, is passed through the translation function so the host computer 112 thinks that the replies were sent directly to it. The host computer 112 will be completely unaware of all the translation being performed by the nomadic router 110.

Figure 11A:
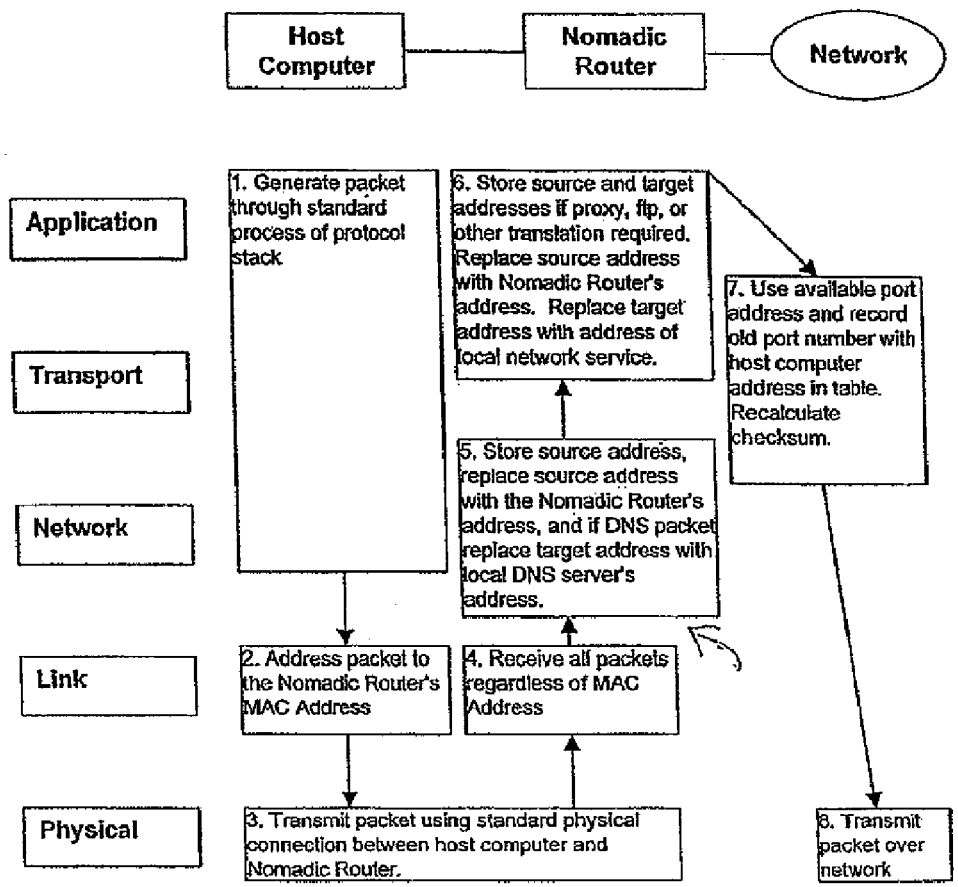
FIGS. 11a and 11b in combination constitute a flowchart illustrating the nomadic router's translation process which takes place in the host computer and nomadic router at various levels in the protocol stack.
Figure 11B:
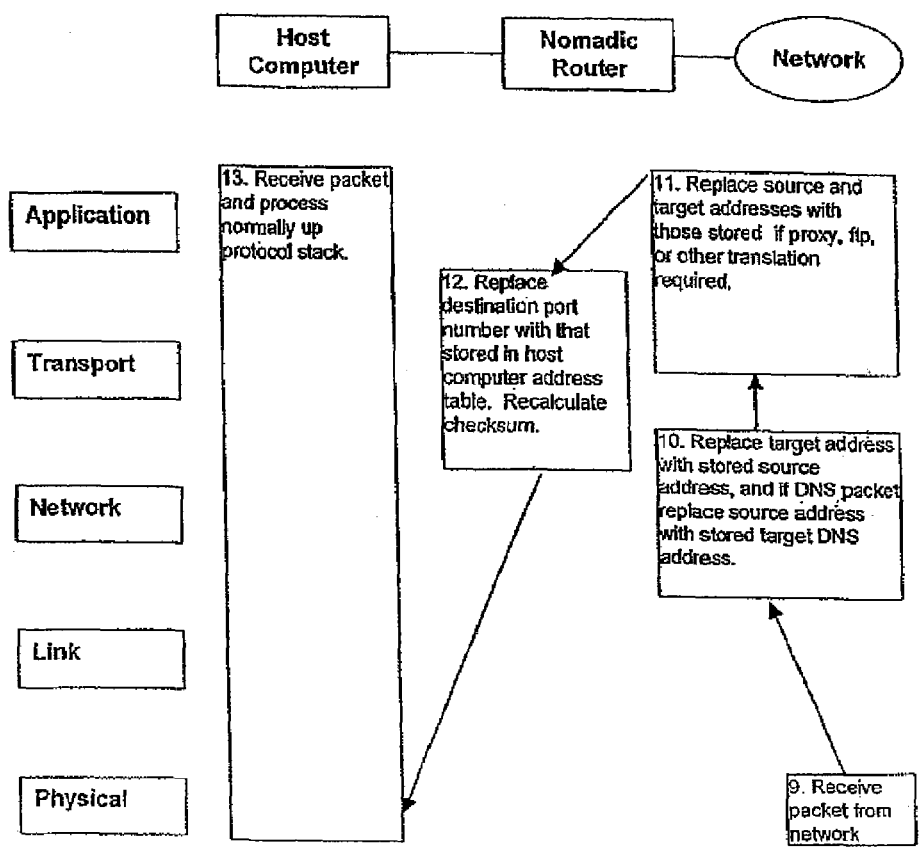

The translation functions works as illustrated in FIGS. 11a and 11b. In these figures, the operations performed in the OSI/ISO model application, transport, network, link and physical layers are illustrated in rows opposite the layer designations. The operations performed by the host computer 112, nomadic router 110 and network 114 are illustrated in columns below the device designations.

The host computer 112 will generate network packets using the current configuration stored in the host computer 112 using the standard protocol stack as shown in step 1. This configuration information is either manually configured in the host computer 112 or obtained using DHCP.

As shown in step 2, when the host computer 112 addresses the link level destination address, the address automatically obtained using the Proxy ARP packet interception routine described earlier, this will cause the host computer 112 to send the packet to the network address of its standard router or home gateway device, but using the link level address of the nomadic router 110.

In step 3, the packet is transmitted across the standard physical connection between the host computer 112 and nomadic router 110. As shown in step 4, the nomadic router 110 will receive the packet at the link level either due to the Proxy APP function which reconfigured the host computer's MAC address, or the nomadic router 110 will have the link level in promiscuous mode which it will cause it to receive the packet even if destined to a different MAC address.

Once the packet is passed to the network layer, shown in step 5, the nomadic router translation function will modify the content of the packet to change the source address to that match of the nomadic router's address instead of the host computer's address. It will also translate other location dependent information such as the name of the local Domain Name Service (DNS) server. When translating the DNS packet, it will change the source address to that of the nomadic router's address and the destination address to that of a local DNS server.

Once the network layer translation is complete, the packet can be translated at the application and transport layers. The application layer is translated next, as shown in step 6, since the transport layer requires a pseudo network layer header which includes the source and destination addresses and the content from the application layer.

At the application layer translation, any addresses which describe the source address of the host computer, such as with FTP, are translated to be that of the nomadic router's address. Any application layer destination addresses, such as a local proxy server, are translated to match that of the server running on the current network.

Once this application translation is complete, the transport layer, as shown in step 7, can complete the checksum and any port number manipulation. The port number is manipulated if more than one host computer 112 is attached to the nomadic router 110. Each host computer 112 when it sends out a request using a specific port is translated to match an available inbound port on the nomadic router 110.

The port number assigned for use with each host computer 112 is stored in a table in the nomadic router 110 and is utilized with the reply packet described later. Finally the packet is sent out over the network 114 in step 8.

When a reply packet comes in from the network 114, as shown in step 9, the nomadic router 110 will receive the packet. In step 110, the nomadic router 110 will perform the reverse network layer translation to set the destination address to that of the host computer rather 112 than the nomadic router's address, and any source address to that replaced by the nomadic router 110 in step 5.

Once this network translation is complete, the packet is translated at the application layer, as shown in step 11, to change the destination address to that of the host computer 112 and the source address to the original destination address stored from step 6. In step 112, any port manipulation performed in step 7 is changed to the original setting and a new checksum is computed. Finally, as shown in step 13, the packet is sent to the host computer 112 which then processes the packet normally.

OPTIONS OF THE NOMADIC ROUTER

By way of motivation, many communication infrastructures are varied and fragmented, and this problem is likely to be exacerbated as more technologies are introduced. For example, high performance LANs, wireless services, cellular telephony, satellite, ubiquitous paging networks, all provide varying degrees of coverage, cost and bandwidth/delay characteristics.

Nomadic Intranet

The Nomadic Intranet provides all network, server type, services for users who which to dynamically create an ad hoc network. This is similar to the instant network nomadic router except the nomadic intranet is a single device with multiple ports into which laptop/devices can be plugged. The instant network nomadic router is distributed to (one per) each host device. The nomadic intranet not only provides ad hoc networking but can also provide services such as temporary file storage, protocol conversion, act as a print server, and provide other services described as part of the Basic nomadic router.

Fixed Nomadic Router

The Fixed nomadic router provides the same basic functionality and architecture as the portable nomadic router but is stored in one location. The fixed nomadic router acts as a surrogate or "Home Agent" for the user when he/she is away on travel. When the user wishes to register or utilize their host device elsewhere in the network, the portable nomadic router will register with the fixed nomadic router where it is temporarily attached to the network so information can be forwarded to the user's new location. The fixed nomadic router can also be used to house the master copy of the user's E-mail for the nomadic E-mail service, or files for the nomadic file synchronizer.

Mobile Virtual Private Network

The nomadic router provides the mapping between the location based IP address used in the internet today and the permanent user based address housed in the host CPU. This mapping is done without support or knowledge of such mapping by the host CPU or user. The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router.

By implementing this protocol as part of the translation function in the nomadic router, the nomadic router can encapsulate packets from the host computer and transmit them back to the fixed nomadic router which are sent out (un-encapsulated) on the native (home) network. Replies from the home network are received by the fixed nomadic router and are encapsulated and sent back to the nomadic router. When packets are transmitted between the nomadic router and fixed nomadic router, the packets are encrypted and sent using the Internet Tunneling Protocol.

Since the nomadic router provides location independence and the fixed nomadic router forwards all packets from a corresponding host to the host computer via the nomadic router, any changes in the location, failure of a network link, or attachment point of the mobile host computer does not cause any open session to be lost. This session loss prevention is possible since the fixed nomadic router pretends to be the mobile host computer, and the nomadic router pretends to be the home network. The fixed nomadic router and nomadic router translation functions hide the link and network loss from the transport and application session.

Communication between users and networks or online services may be effectuated through ports, for example, located within hotel rooms or multi-dwelling units, or through conventional dial-up communications, such as through the use of telephone or cable modems. According to one aspect of the invention, users can be are redirected to a portal page, as described below. After being redirected to the portal page, the user is subjected to a AAA process. Based upon the AAA process, the user may be permitted transparent access to the destination network or may be redirected to a login page in order to gather additional information to identify the user.

Identifying the user is crucial in authorizing access to networks or online services, as such services are typically provided for a fee and may be customized based upon the user, user's location, or user's computer. As discussed below, the user's identification may be used to direct the user to a specific portal page, which can be a particular webpage. As such, the system of the present invention includes means for identifying a user based upon an attribute associated with the user that is contained within the packet transmitted from the user's computer. Attributes can include any data well known in the art for identifying the user, the user's location, and/or the user's computer. In general, identifying a user's computer that accesses a network can be done by a media access control (MAC) associated with the computer. Identifying a computer based upon a MAC address is well known to those of skill in the art, and will not be discussed in detail herein. Additionally, the attribute can be based upon a user name, ID, or according to one advantageous embodiment described below, a particular location, such as from a communications port in a hotel room. As such, the location of the user can be the identifiable attribute.

According to one embodiment of the present invention, after a user accesses the computer network using a computer in communication with the gateway device 12, as described above, the user is directed to a portal page. The portal page may be maintained by an ISP or an enterprise network, or by any entity maintaining a webpage on the Internet. According to one aspect of the invention, the portal page can be a webpage containing any information whatsoever, and can be created by the ISP, enterprise network administrator or user. The portal page can contain information specific to the user accessing the network, as discussed in detail below.

Regardless of whether a user accessing the computer network is authorized access to the network, the user is redirected to a portal page. After being redirected to a portal page, the gateway device of the present invention determines the authorization and access rights of the user based upon an Authentication, Authorization and Accounting method.

According to one aspect of the invention, a user may be identified and authorized access to the network or online services based upon attributes associated with the user, such as the user's location or user's computer. When this occurs, the user can be forwarded to a portal page unique to that user. As described below, and also above, the user may be identified without being queried to input any identification information so that upon accessing the computer network the user is automatically directed to a generic portal page or a portal page established specifically for and unique to that user. According to another aspect of the invention, a user may be identified and authorized access based upon the user's identity after being redirected to the portal page. The user may have to enter a login name and password while at the portal page or after being directed to a login page so that the ISP or other entity maintaining the gateway device can identify the user. After entering identifying data, the user may be directed to a particular portal page, as in the first aspect described above. According to a third aspect of the invention, the user is not authorized access to the network. Where this occurs the user will be directed from the portal page to a login page where the user will have to input identification information, such as the user's name, address, credit card number, and other relevant data so that the user may be authorized to access the network. After the user enters sufficient login data to establish authorization, the user may be redirected to a portal page.

The redirection is accomplished by a Home Page Redirect (HPR) performed by the gateway device, a AAA server, or by a portal page redirect unit located internal to or external to the gateway device. To accomplish the redirection of a user to a portal page, HPR utilizes a Stack Address Translation (SAT) operation to direct the user to the portal page, which is preferably local to the gateway device so that the redirection will be efficient and fast. This is accomplished by redirecting the user to a protocol stack using network and port address translation to the portal server that can be internal to the computer network or gateway device. More specifically, the gateway device, AAA server or portal page redirect unit receives the user's HTTP request for a web page and sends back the HTTP response reversing the network and port address translation the portal server, essentially acting as a transparent 'go-between' to the user and portal server. It will be appreciated, however, that to receive the HTTP request the gateway device, AAA server or portal page redirect unit must initially open a Transmission Control Protocol (TCP) connection to a server in line with the user-requested Internet address.

According to one aspect of the present invention, when a user initially attempts to access a destination location, the gateway device, AAA server or portal page redirect unit receives this request and routes the traffic to a protocol stack on a temporary server, which can be local to the gateway device. This can occur where a user initially opens a web browser resident on the user's computer and attempts to access a destination address, such as an Internet site. The destination address can also include any address accessible via the network or an online service, and can include the portal page. The protocol stack can pretend to be the user-entered destination location long enough to complete a connection or 'handshake'. Thereafter, this protocol stack directs the user to the portal server, which can be local to the gateway device to facilitate higher speed communication. The redirection to the portal server can be accomplished by redirecting web pages only, rather than all traffic, including E-mails, FTPs, or any other traffic. Therefore, once authorized, if a user does not attempt to access a webpage through the user's Internet browser, the gateway device can forward the communication transparently to the user's requested destination without requiring the user to access the portal page. Furthermore, according to one aspect of the invention, specific user-input destination addresses may be authorized to pass through the gateway device without being redirected.

The portal page can also be specialized based on the user, user's location, user's computer, or any combination thereof. For example, assuming that the user has been authenticated and has authorization, the gateway device can present users with a portal page that identifies, among other things, the online services or other computer networks that are accessible via the gateway device. In addition, the portal page presented by the gateway device can provide information regarding the current parameters or settings that will govern the access provided to the particular user. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the user a higher rate for their service. For example, a user may elect to increase the transfer rate at which signals are transmitted across the computer network and pay a correspondingly higher price for the expedited service.

The portal page may include advertising tailored to the specific needs of the user. The gateway device would be capable of tailoring the material based upon user profiles in the network. The portal page may also incorporate surveys or links to surveys to provide the network provider with beneficial statistical data. As an ancillary benefit, the user who responds to the surveys may be rewarded with network access credit or upgraded quality. Additionally, the service provided could offer additional services to the user by way of the portal page or links to these services may be offered on the portal page. These services offered by the network service provider are not limited to the services related to the network connection. For example, a hotel may desire to offer the user in-room food service or a multi-unit dwelling may want to offer house cleaning service.

The portal page may also comprise information related to the status of the current network session. By way of example this information may include, current billing structure data, the category/level of service that the user has chosen, the bandwidth being provided to the user, the bytes of information currently sent or received, the current status of network connection(s) and the duration of the existing network connection(s). It is to be understood, by those skilled in the art to which this invention relates that all conceivable useful information relating to the current network session could be displayed to the user in a multitude of combinations as defined by the user and/or the gateway administrator. The gateway administrator will have the capability to dynamically change the information supplied in the portal page based on many factors, including the location of the user, the profile of the user and the chosen billing scheme and service level. The information provided in the portal page may prompt the user to adjust any number of specific parameters, such as the billing scheme, the routing, the level of service and/or other user-related parameters.

The portal page may be implemented with an object-oriented programming language such as Java developed by Sun Microsystems, Incorporated of Mountain View, Calif. The code that defines the portal page can be embodied within the gateway device, while the display monitor and the driver are located with the host computers that are in communication with the gateway device. The object oriented programming language that is used should be capable of creating executable content (i.e. self-running applications) that can be easily distributed through networking environments. The object oriented programming language should be capable of creating special programs, typically referred to as applets that can be incorporated in portal pages to make them interactive. In this invention the applets take the form of the portal pages. It should be noted that the chosen object-oriented programming language would require that a compatible web browser be implemented to interpret and run the portal page. It is also possible to implement the portal page using other programming languages, such as HTML, SGML and XML; however, these languages may not be able to provide all the dynamic capabilities that languages, such as Java provide.

By re-directing the user to the portal page the gateway administrator or network operator is provided the opportunity to present the user with updated information pertaining to the remote location (i.e. the hotel, the airport etc.). By way of example the portal page may provide for links to the corporate home page, a travel site on the Internet, an Internet search engine and a network provider home page. Additionally, the buttons or any other field within the portal page may include other types of information options, such as advertising fields or user-specific links or fields based upon data found in the user's profile or inputted by the user.

It will be appreciated that the portal page is not limited to supplying information related to the user's billing and service plans. It is also possible to configure the portal page to include information that is customized to the user or the location/site from which the user is remotely located. For example, the user may be located at a hotel for the purpose of attending a specific convention or conference either in the hotel or within the immediate vicinity of the hotel. The gateway device may have "learned" this information about the user through an initial log-on profile inquiry or the gateway administer may have inputted this information into a database.

The gateway device can store user profile information within a user-specific AAA database, as described below, or it can store and retrieve data from external databases. The gateway device can be configured to recognize these profiles and to customize the portal page accordingly. In the hotel scenario, the portal page may include a link for convention or conference services offered by the hotel.

In another example of location specific portal page data, the user may be remotely accessing the gateway device while located in a specific airport terminal. The gateway device will be configured so that it is capable of providing ready access to information related to that specific airport terminal, i.e. information pertaining to the current flights scheduled to depart and arrive that terminal, the retail services offered in that specific terminal, etc. In this manner, the portal page may include a link for terminal specific flight information and/or terminal specific retail services available to the user.

It will also be appreciated that the HPR may be configured so a user is redirected to a portal page upon specific default occurrences, such as a time out, or according to preset time. For example, the portal page may act as a screen-saver, where the user is redirected to a portal page after a given period of inactivity. These functions may be established by the ISP or enterprise network administrator.

Customization of the information comprising the portal page is not limited to the gateway administrator or the network operator. The user may also-be able to customize the information that is provided in the portal page. The user customization may be accomplished either directly by the user configuring the portal page manually or indirectly from the gateway device configuring the portal page in response to data found in the user-specific profile. In the manual embodiment the user may be asked to choose which information or type of information they would like supplied in the portal page for that specific network session. For instance, the user may require an alarm clock counter to insure an appointment is met or the user may require periodical updates of a specific stock quote. The information that a user customizes for the portal page may be network session specific, may be associated with the duration of a gateway subscription or may be stored in a user profile for an indefinite period of time. The gateway device's ability to communicate with numerous user databases provides the basis for storing user specific profiles for extended periods of time.

As explained above, the portal page presented to the user can be dependent upon an attribute associated with the user, such as the user's identification, the user's location, an address associated with the user's computer, or a combination thereof. The means in which a user is identified and access rights are determined is based upon an Authentication, Authorization and Accounting (AAA) method implemented by the AAA server.

One function of the AAA server is to identify the user in communication with the gateway device in a manner that is transparent to the user. That is, the user will not be required to reconfigure the computer or otherwise change the home network settings, and no additional configuration software will have to be added to the computer. According to one embodiment of the present invention, after a user is directed to a portal page, the AAA server can be accessed to authorize and authenticate the user. Therefore, upon accessing the network, the user may be forwarded to a generic portal page, and after the user may be authenticated, the user can be forwarded via HPR and SAT to a specialized portal page, as described above.

After receiving a request for access from a user, forwarding the user to a portal page, and identifying the user or location the AAA server then determines the access rights of the particular user. In addition to storing whether users have valid access rights, the user profile database can also include specialized access information particular to a specific location or user, such as the bandwidth of the user's access, or a portal page to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room.

Assuming that a user does not have a subscription for access to the network, a login page enables new users to subscribe to the computer network so that they may subsequently obtain access to networks or online services transparently through the gateway device. The user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user is redirected from the portal page via HPR and SAT to a location, such as a login page, established to validate new users. SAT and HPR can intervene to direct the user to a webserver (external or internal) where the user has to login and identify themselves. Location-based information and authorization, as described in detail in U.S. Patent Application Ser. No. 60/161,093, incorporated herein by reference, can be sent to the portal page as part of this redirection process. This enables the portal page to be customized to include customized information, such as locale restaurant ads or train schedules.

Assuming that a user has not been authorized access to the network based upon location based identification or user input identification, the user must provide the gateway device with sufficient information to become authorized access. Where the user is not authorized access the user is forwarded via HPR and SAT from the portal page to a login page. The login page enables new users to subscribe to the computer network so that they may subsequently obtain access to networks or online services transparently through the gateway device. To direct the users to a login page the AAA server calls upon the HPR function. The HPR directs the user to the login page, and after the user has entered requisite information into the login page, the AAA server adds the new information to the customer profile database and can direct the user to the user's desired destination, such as an Internet address or can return the user to a portal page, depending upon the design of the system. Thus, new users can gain access to networks or online services without being predefined in the user profile database.

After receiving the user's login information, the AAA server will create a user profile utilizing this information so that the user will be able to obtain immediate access to the network next time the user logs in without being required to enter login information again. The AAA server can create a profile for the user in a locally stored user profile database, or can update the user profile in a database external to the gateway device. Regardless of the location of the user profile, the next time the user attempts to login the user's profile will be located in the user profile database, the user's access rights determined, and the user allowed transparent access to networks or services.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A network gateway having an IP address and a hardware address, configured to process packets communicated from a browser operating on a user host device, the user host device having configuration information specifying at least a MAC address of the user host device, the network gateway comprising:
   a database configured to be populated with configuration information;
   a redirection-determination module in communication with the database, the redirection-determination module responsive to packets communicated from the browser to determine whether to redirect the browser to a web-server configured to present a login portal, wherein the redirection determination is based on the MAC address of the user host device and configuration information in the database;
   a user-device-location-detection module that determines a network location of the user host device, the user-device-location-detection module configured to communicate information to the web-server about the network location, so that the web-server can provide network-location-specific information on the login portal; and
   a network-packet-translation module configured to modify at least one user network packet transmitted from the user host device to an external network location, the at least one user network packet being modified so that the source IP address corresponds to the network gateway, the network packet translation module further configured to modify at least one external network packet transmitted from the external network location to the network gateway, the external network packet being modified so that the destination IP address corresponds to the user host device.

2. The network gateway of claim 1, wherein the web-server is internal to the network gateway.

3. The network gateway of claim 1, wherein the configuration database is internal to the network gateway.

4. The network gateway of claim 1, wherein the login portal presents billing information.

5. The network gateway of claim 1, wherein the login portal presents network connection service options.

6. The network gateway of claim 1, wherein the configuration information comprises authentication information.

7. The network gateway of claim 1, wherein the database is searchable by MAC address.

8. The network gateway of claim 1, wherein the web-server provides bandwidth information on the login portal.

9. The network gateway of claim 1, wherein the web-server provides billing information on the login portal.

10. The network gateway of claim 1, wherein the web-server provides service level information on the login portal.

11. The network gateway of claim 1, wherein the configuration information in said database comprises one or more MAC addresses associated with one or more user host devices.

12. The network gateway of claim 1, wherein the configuration information comprises a circuit ID.

13. The network gateway of claim 1, wherein the configuration information comprises a MAC address.

14. The network gateway of claim 1, wherein the configuration information comprises a user name.

15. The network gateway of claim 1, wherein the configuration information comprises a user ID.

16. The network gateway of claim 1, wherein the configuration information comprises a user password.

17. The network gateway of claim 1, wherein the configuration information comprises a location of the user host device.

18. The network gateway of claim 1, wherein the configuration information comprises a communications port.

19. The network gateway of claim 1, wherein the database is in communication with a AAA server.

20. The network gateway of claim 19, wherein the AAA server is in communication with a second network gateway.

21. The network gateway of claim 1, wherein the redirection-determination module is located internal to the gateway device.

22. The network gateway of claim 1, wherein the redirection-determination module is located external to the gateway device.

23. The network gateway of claim 1, wherein the login portal is configured to be displayed in a web browser on the user host device.

24. The network gateway of claim 1, wherein the login portal comprises an applet configured to be executed on the user host device.

25. The network gateway of claim 1, wherein the network location is a hotel room.

26. The network gateway of claim 1, wherein the network location is an apartment address.

27. The network gateway of claim 1, wherein the network location is encoded using Virtual Local Area Network tagging.

28. The network gateway of claim 1, wherein the network location is an individual unit in a multi-resident dwelling environment.

29. The network gateway of claim 1, wherein the network location is a room in an apartment building.

30. The network gateway of claim 1, wherein the network location is floor within a building.

31. The network gateway of claim 1, wherein the network location is wing within a building.

32. The network gateway of claim 1, wherein the network location is a building.

33. The network gateway of claim 1, wherein the network location is one port of a plurality of ports in a single room.

34. The network gateway of claim 1, wherein the network location is an airport kiosk.

35. The network gateway of claim 1, wherein the network location is a retail outlet.

36. The network gateway of claim 1, wherein the information communicated to the web-server about the network location comprises a circuit ID.

37. The network gateway of claim 1, wherein the information communicated to the web-server about the network location comprises a MAC address.

38. The network gateway of claim 1, wherein the information communicated to the web-server about the network location comprises a user name.

39. The network gateway of claim 1, wherein the information communicated to the web-server about the network location comprises a user ID.

40. The network gateway of claim 1, wherein the information communicated to the web-server about the network location comprises a user password.

41. The network gateway of claim 1, wherein the information communicated to the web-server about the network location comprises a location of the user host device.

42. The network gateway of claim 1, wherein the information communicated to the web-server about the network location comprises a communications port.

43. The network gateway of claim 1, wherein the network-location-specific information includes a link to a corporate home page.

44. The network gateway of claim 1, wherein the network-location-specific information includes a link to a travel site.

45. The network gateway of claim 1, wherein the network-location-specific information includes a link to a search engine.

46. The network gateway of claim 1, wherein the network-location-specific information includes a link to a network provider home page.

47. The network gateway of claim 1, wherein the network-location-specific information includes advertising fields.

48. The network gateway of claim 1, wherein the network-location-specific information includes billing and service plans.

49. The network gateway of claim 1, wherein the network-location-specific information includes specific conventions or conferences in or near a hotel.

50. The network gateway of claim 1, wherein the network-location-specific information includes flights scheduled to depart or arrive at an airport terminal.

51. The network gateway of claim 1, wherein the network-location-specific information includes retail services at an airport terminal.

52. The network gateway of claim 1, wherein the network-location-specific information includes locale restaurant ads.

53. The network gateway of claim 1, wherein the network-location-specific information includes train schedules.

54. The network gateway of claim 1, wherein the network-location-specific information includes information customized by a user of the user host device.

55. The network gateway of claim 1, wherein modifying at least one user network packet transmitted from the user host device to an external network location comprises generating an outgoing packet based on the network packet transmitted from the user host device, the outgoing packet including at least one or more attributes that are different than the network packet transmitted from the user host device.

56. The network gateway of claim 55, wherein the at least one or more attributes is a source address.

57. The network gateway of claim 55, wherein the at least one or more attributes is a checksum.

58. The network gateway of claim 55, wherein the at least one or more attributes is an application specific parameter.

59. The network gateway of claim 1, wherein the login portal requests login information.

60. The network gateway of claim 59, wherein the login information comprises a user name and password.

61. The network gateway of claim 1, wherein the external network location is a publicly addressable location.

62. A network system that provides network access to a user host device which sends network communications having a MAC address, the network system comprising:

a network connection configured to receive a network communication from the user host device, the network communication identifying at least an original source IP address, an original target IP address, and an original source MAC address, the communication including one or more packets;

a database that contains configuration information comprising at least MAC addresses;

a database lookup routine that determines whether the original source MAC address corresponds to configuration information in the database;

a user-device-location-detection routine that determines a network location of the user host device, the user-device-location-detection routine configured to communicate information to a web-server about the network location, so that the web-server can provide network-location-specific information on a login portal;

a user-communication-processing routine that receives and processes the network communication from the user host device to transmit a translated network communication, the network communication from the user host device including the original source MAC address of the user host device that is not authorized to access a network, the user-communication-processing routine configured to process the at least one network communication from the user host device so that the translated network communication has:

a target IP address that is different from the original target IP address, that is associated with the network location of the user host device, and that corresponds to an IP address associated with a redirection server; and a second source IP address that is different from the an original source IP address and that corresponds to an IP address of the network device, the user-communication-processing routine communicating with the redirection server that is configured to generate browser redirection communication in response to the communication from the user-communication-processing routine; and a redirection-communication-processing routine that processes the browser redirect communication so that the browser redirect communication has:

an IP source address that corresponds to the original target IP address of the processed user communication and a target IP address that corresponds to the IP address of the user host device, the redirection-communication-processing routing further configured to transmit the browser redirect communication to the host device.

63. The network system of claim 62, wherein the browser redirect message comprises a login page location.

64. The network system of claim 63, wherein the login page location comprises network location information corresponding to the user host device.

65. The network system of claim 63, further comprising:

an authorization routine that receives login information from a login server associated with the login page location, wherein the login information is used to update the database.

66. The network system of claim 62, wherein the user communication-processing routine also processes at least one user communication from a user host device with a MAC address that is authorized to access the network, the user communication-processing routine configured to process the at least one authorized user communication so that the communication has an IP address of the network devices.

67. The network system of claim 62, wherein the browser redirect message comprises network location information corresponding to the user host device.

68. The network system of claim 62, wherein the network is the Internet.

69. The network system of claim 62, wherein the configuration information comprises a circuit ID.

70. The network system of claim 62, wherein the configuration information comprises a MAC address.

71. The network system of claim 62, wherein the configuration information comprises a user name.

72. The network system of claim 62, wherein the configuration information comprises a user ID.

73. The network system of claim 62, wherein the configuration information comprises a user password.

74. The network system of claim 62, wherein the configuration information comprises a location of the user host device.

75. The network system of claim 62, wherein the configuration information comprises a communications port.

76. The network system of claim 62, wherein the database is in communication with a AAA server.

77. The network system of claim 76, wherein the AAA server is in communication with a second network system.

78. The network system of claim 62, wherein the login portal is configured to be displayed in a web browser on the user host device.

79. The network system of claim 62, wherein the login portal comprises an applet configured to be executed on the user host device.

80. The network system of claim 62, wherein the network location is a hotel room.

81. The network system of claim 62, wherein the network location is an apartment address.

82. The network system of claim 62, wherein the network location is encoded using Virtual Local Area Network tagging.

83. The network system of claim 62, wherein the network location is an individual unit in a multi-resident dwelling environment.

84. The network system of claim 62, wherein the network location is a room in an apartment building.

85. The network system of claim 62, wherein the network location is floor within a building.

86. The network system of claim 62, wherein the network location is wing within a building.

87. The network system of claim 62, wherein the network location is a building.

88. The network system of claim 62, wherein the network location is one port of a plurality of ports in a single room.

89. The network system of claim 62, wherein the network location is an airport kiosk.

90. The network system of claim 62, wherein the network location is a retail outlet.

91. The network system of claim 62, wherein the information communicated to the web-server about the network location comprises a circuit ID.

92. The network system of claim 62, wherein the information communicated to the web-server about the network location comprises a MAC address.

93. The network system of claim 62, wherein the information communicated to the web-server about the network location comprises a user name.

94. The network system of claim 62, wherein the information communicated to the web-server about the network location comprises a user ID.

95. The network system of claim 62, wherein the information communicated to the web-server about the network location comprises a user password.

96. The network system of claim 62, wherein the information communicated to the web-server about the network location comprises a location of the user host device.

97. The network system of claim 62, wherein the information communicated to the web-server about the network location comprises a communications port.

98. The network system of claim 62, wherein the network-location-specific information includes a link to a corporate home page.

99. The network system of claim 62, wherein the network-location-specific information includes a link to a travel site.

100. The network system of claim 62, wherein the network-location-specific information includes a link to a search engine.

101. The network system of claim 62, wherein the network-location-specific information includes a link to a network provider home page.

102. The network system of claim 62, wherein the network-location-specific information includes advertising fields.

103. The network system of claim 62, wherein the network-location-specific information includes billing and service plans.

104. The network system of claim 62, wherein the network-location-specific information includes specific conventions or conferences in or near a hotel.

105. The network system of claim 62, wherein the network-location-specific information includes flights scheduled to depart or arrive at an airport terminal.

106. The network system of claim 62, wherein the network-location-specific information includes retail services at an airport terminal.

107. The network system of claim 62, wherein the network-location-specific information includes locale restaurant ads.

108. The network system of claim 62, wherein the network-location-specific information includes train schedules.

109. The network system of claim 62, wherein the network-location-specific information includes information customized by a user of the user host device.

110. The network system of claim 62, wherein the translated network communication includes at least one or more additional attributes that are different than the network communication transmitted from the user host device.

111. The network system of claim 110, wherein the at least one or more attributes is a checksum.

112. The network system of claim 110, wherein the at least one or more attributes is an application specific parameter.

113. The network system of claim 62, wherein the login portal requests login information.

114. The network system of claim 62, wherein the login information comprises a user name and password.

* * * * *

UNITED STATES PATENT AND TRADEMARK OFFICE
CERTIFICATE OF CORRECTION

PATENT NO. : 7,689,716 B2  Page 1 of 1
APPLICATION NO. : 11/427143
DATED : March 30, 2010
INVENTOR(S) : Short et al.

It is certified that error appears in the above-identified patent and that said Letters Patent is hereby corrected as shown below:

On the Title Page at Item (63), Line 4, after "Pat. No. 6,636,894" insert --Application No. 09/693,060 is also a continuation-in-part of application No. 09/458,602.--

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,689,716 B2 |
| APPLICATION NO. | : 11/427143 |
| DATED | : March 30, 2010 |
| INVENTOR(S) | : Short et al. |

It is certified that error appears in the above-identified patent and that said Letters Patent is hereby corrected as shown below:

On the Title Pg (Item 63) Related U.S. Application Data, at line 4, change "09/485,569," to --09/458,569,--.

On the Title Pg (Item 56) Page 4, at line 41, under Other Publications, change "deny_$_{info}$";" to --deny_info";--.

On the Title Pg (Item 56) Page 4, at line 62, under Other Publications, after "Networks, Inc. vs. Nomadix, Inc.;" delete "Nomadix, Inc.;".

In column 1, at line 11, after "now" delete "of".

In column 1, at line 22, change "Device,"" to --Device."--.

In column 22, at line 5, change "11as" to --110a--.

In column 22, at line 38, change "conununication" to --communication--.

In column 25, at line 27, begin a new paragraph after "Apparatus Packaging" starting with the words "As described above".

In column 26, at line 24, change "itself" to --itself.--.

In column 28, at line 28, change "APP" to --ARP--.

In column 39, at line 4, in Claim 62, after "the" delete "an".

In column 39, at line 9, in Claim 62, before "browser" insert --a--.

In column 39, at lines 16-17, in Claim 62, change "communication" to --communication,--.

In column 39, at line 39, in Claim 66, change "devices." to --device.--.

Signed and Sealed this

Fifth Day of October, 2010

David J. Kappos
*Director of the United States Patent and Trademark Office*